United States Patent
Hunt et al.

(10) Patent No.: US 12,348,253 B2
(45) Date of Patent: *Jul. 1, 2025

(54) OPTICAL COMMUNICATIONS SYSTEM

(71) Applicants: The Boeing Company, Chicago, IL (US); California Institute of Technology, Pasadena, CA (US)

(72) Inventors: Jeffrey H. Hunt, Thousand Oaks, CA (US); Fatemeh Aghlmand, Pasadena, CA (US); Azita Emami, Pasadena, CA (US)

(73) Assignees: The Boeing Company, Chicago, IL (US); California Institute of Technology, Pasadena, CA (US)

( * ) Notice: Subject to any disclaimer, the term of this patent is extended or adjusted under 35 U.S.C. 154(b) by 365 days.

This patent is subject to a terminal disclaimer.

(21) Appl. No.: 18/151,934

(22) Filed: Jan. 9, 2023

(65) Prior Publication Data

US 2023/0223974 A1    Jul. 13, 2023

Related U.S. Application Data

(60) Provisional application No. 63/298,121, filed on Jan. 10, 2022.

(51) Int. Cl.
*H04B 1/12* (2006.01)
*H04B 1/18* (2006.01)
(Continued)

(52) U.S. Cl.
CPC ............ *H04B 1/12* (2013.01); *H04B 1/18* (2013.01); *H04B 10/27* (2013.01); *H04B 10/616* (2013.01);
(Continued)

(58) Field of Classification Search
CPC . H04B 1/12; H04B 1/18; H04B 10/27; H04B 10/616; H04B 10/6164;
(Continued)

(56) References Cited

U.S. PATENT DOCUMENTS

2010/0074370 A1* 3/2010 Gerlach .................. H03G 3/30
2013/0143510 A1* 6/2013 Lee ......................... H04B 1/18
455/296

(Continued)

OTHER PUBLICATIONS

Hunt et al., "Optical Communications Systems," U.S. Appl. No. 18/151,970, filed Jan. 9, 2023, 79 pages.
Hunt et al., "Adaptive Control and Testing System for an Adaptive Receiver," U.S. Appl. No. 18/151,996, filed Jan. 9, 2023, 74 pages.
Notice of Allowance, dated Apr. 17, 2025, regarding U.S. Appl. No. 18/151,996, 9 pages.
Office Action, dated Apr. 4, 2025, regarding U.S. Appl. No. 18/151,996, 28 pages.

*Primary Examiner* — Lana N Le
(74) *Attorney, Agent, or Firm* — Yee & Associates, P.C.

(57) ABSTRACT

An adaptive receiver comprising a current buffer, an inverter-based transimpedance that receives input from the current buffer, an average current control loop that feeds back from the inverter-based transimpedance to the current buffer, a variable gain circuit that receives input from the inverter-based transimpedance, a differential voltage amplifier that receives input from the variable gain circuit, an automatic gain control loop that feeds back from the differential voltage amplifier to the inverter-based transimpedance and variable gain circuit, and a differential buffer that receives input from the differential voltage amplifier.

24 Claims, 18 Drawing Sheets

(51) Int. Cl.
  *H04B 10/27* (2013.01)
  *H04B 10/61* (2013.01)
(52) U.S. Cl.
  CPC ..... *H04B 10/6164* (2013.01); *H04B 10/6165* (2013.01)
(58) Field of Classification Search
  CPC ............ H04B 10/6165; H04B 10/1129; H04B 10/118; H04B 10/60; H04B 10/6931; H04B 10/69; H04B 10/6933; H04B 1/16; H04B 10/2575; H03G 3/20; H03G 3/3036; H03G 3/3084; H03F 2200/435; H03F 1/3211; H03F 3/45497; H03F 2200/78; H03F 2203/45288; H03F 3/45076; H03F 3/45659
  See application file for complete search history.

(56) References Cited

U.S. PATENT DOCUMENTS

| | | | |
|---|---|---|---|
| 2015/0035595 A1* | 2/2015 | Harwalkar | H04B 1/18 |
| 2017/0126320 A1 | 5/2017 | Cho et al. | |
| 2017/0201327 A1* | 7/2017 | Jiang | H04B 10/616 |
| 2018/0131446 A1 | 5/2018 | Fan et al. | |
| 2019/0393974 A1 | 12/2019 | Xu et al. | |
| 2020/0014349 A1* | 1/2020 | Schober | H03F 3/45476 |
| 2023/0223974 A1 | 7/2023 | Hunt et al. | |
| 2023/0224044 A1* | 7/2023 | Hunt | H04B 1/12 |
| 2023/0224046 A1* | 7/2023 | Hunt | H04B 10/27 |
| 2024/0204740 A1* | 6/2024 | Park | H03F 3/45 |

\* cited by examiner

OPTICAL COMMUNICATIONS SYSTEM

CROSS-REFERENCE TO RELATED APPLICATIONS

This application claims the benefit of U.S. Provisional Patent Application Ser. No. 63/298,121, filed Jan. 10, 2022, and entitled "AN 8 GBPS ADAPTIVE RECEIVER FOR RF OVER FSO IN 28 NM CMOS;" which is incorporated herein by reference in its entirety.

This application is related to the following U.S. Patent Applications entitled "Optical Communications System", application Ser. No. 18/151,970, and entitled "Adaptive Control and Testing System for an Adaptive Receiver", application Ser. No. 18/151,996, filed even date hereof, and awarded a Notice of Allowance on Apr. 17, 2025, assigned to the same assignee, and incorporated herein by reference in their entirety.

BACKGROUND INFORMATION

1. Field

The present disclosure relates generally to optical communications and in particular, to optical communications using embedded radio frequency signals encoding data.

2. Background

The communication of data between space and ground platforms is currently performed using radio frequencies or microwave carrier frequencies. In some examples, data is encoded in signals using megahertz bandwidths. In some examples, the signals can be converted to data and the data can be encoded in optical signals. The optical signals can then be transmitted between space and ground platforms. The encoding and decoding of data from one type of carrier to another carrier can increase the amount of time needed. Further, the locations where these conversions are performed can be bottlenecks for communications.

The use of radio frequency to transmit data can be more challenging than desired in various environments. For example, in a physically cluttered environment it can be challenging to create a line of sight communications using radio frequency signals.

Therefore, it would be desirable to have a method and apparatus that take into account at least some of the issues discussed above, as well as other possible issues.

SUMMARY

An illustrative embodiment provides an adaptive receiver comprising a current buffer, an inverter-based transimpedance that receives input from the current buffer, an average current control loop that feeds back from the inverter-based transimpedance to the current buffer, a variable gain circuit that receives input from the inverter-based transimpedance, a differential voltage amplifier that receives input from the variable gain circuit, an automatic gain control loop that feeds back from the differential voltage amplifier to the inverter-based transimpedance and variable gain circuit, and a differential buffer that receives input from the differential voltage amplifier.

Another illustrative embodiment provides a receiver system. The receiver system comprises an optical receiver comprising a photodiode and an adaptive receiver that receives an input current from the photodiode. The adaptive receiver comprises a feedback-controlled current buffer, a voltage-controlled inverter-based transimpedance that receives input from the feedback-controlled current buffer, a current control loop that automatically subtracts excessive average current of the photodiode from the input current, a variable gain circuit that receives input from the voltage-controlled inverter-based transimpedance, an automatic gain control loop, a differential voltage amplifier that receives input from the variable gain circuit, and a differential buffer that receives input from the differential voltage amplifier and outputs a recovered radio frequency signal. A number of demodulators demodulate the recovered radio frequency signal into respective baseband signals.

Another illustrative embodiment provides an adaptative receiver comprising a current buffer that receives input current from a photodiode, a variable gain transimpedance amplifier connected to output of the current buffer, an average current control feedback loop from the variable gain transimpedance amplifier back to the current buffer, a differential transadmittance amplifier connected to output of the variable gain transimpedance amplifier, a differential transimpedance amplifier connected to output of the differential transadmittance amplifier, first and second capacitors connected between input and output of the differential transimpedance amplifier, a differential voltage amplifier connected to output of the differential transimpedance amplifier, an automatic gain control feedback loop from the differential voltage amplifier to the variable gain transimpedance amplifier and differential transimpedance amplifier, and a differential buffer connected to output of the differential voltage amplifier.

Another illustrative embodiment provides a communications system. The communications system comprises a receiver configured to convert a modulated coherent optical signal to a number of radio frequency signals encoding data. The receiver comprises an optical receiver that generates an electrical current in response to receiving the modulated coherent optical signal. The receive also comprises an adaptive circuit connected to the optical receiver, wherein the adaptive circuit recovers the radio frequency signal from the electrical current, adjusting for changes in the modulated coherent optical signal caused by variation in received optical intensity occurring during propagation of the modulated coherent optical signal, and outputs the radio frequency signal.

The features and functions can be achieved independently in various embodiments of the present disclosure or may be combined in yet other embodiments in which further details can be seen with reference to the following description and drawings.

DETAILED DESCRIPTION

The illustrative embodiments recognize and take into account a number of different considerations as described herein. The illustrative embodiments recognize and take into account that wireless signals operate in the radio frequency (RF) or microwave frequencies, while internet signals have carriers in the optical frequencies. The illustrative embodiments also recognize and take into account that it would be desirable to change from one carrier frequency to another while maintaining the information carried by the RF or microwave signal.

The illustrative embodiments also recognize and take into account that, while the information signals are generated in the MHz frequencies, it would be desirable to send the signals on optical carriers, since the beam spread (due to diffraction) would be orders of magnitude smaller in the optical frequencies.

The illustrative embodiments also recognize and take into account that changing from one of these carrier frequencies to the other involves detection and retransmission, which creates significant temporal bottlenecks that cannot be removed simply by adding more transmission bandwidth (i.e., optical fiber).

The illustrative embodiments provide a system that writes a signal carried by an RF or microwave carrier directly onto an optical carrier. Because the optical carrier is orders of magnitude higher than the RF signal, it is possible to put more information onto the optical system.

The illustrative embodiments also recognize and take into account that the use of radio frequency to transmit data can be more challenging than desired in various environments. For example, in a physically cluttered environment it can be challenging to create a line of sight communications using radio frequency signals. For example, establishing a communications link between two buildings can be achieved using a radio frequency repeater or by enlarging the propagation cone or radiation pattern. However, these types of structures can be larger than desired based on the wavelength for the carrier signals.

The communication of data between space and ground platforms is currently performed using radio frequencies or microwave carrier frequencies. In some examples, data is encoded in signals using megahertz bandwidths. In some examples, the signals can be converted to data and the data can be encoded in optical signals. The optical signals can then be transmitted between space and ground platforms. The encoding and decoding of data from one type of carrier to another carrier can increase the amount of time needed. Further, the locations where these conversions are performed can be bottlenecks for communications.

Figure 1:
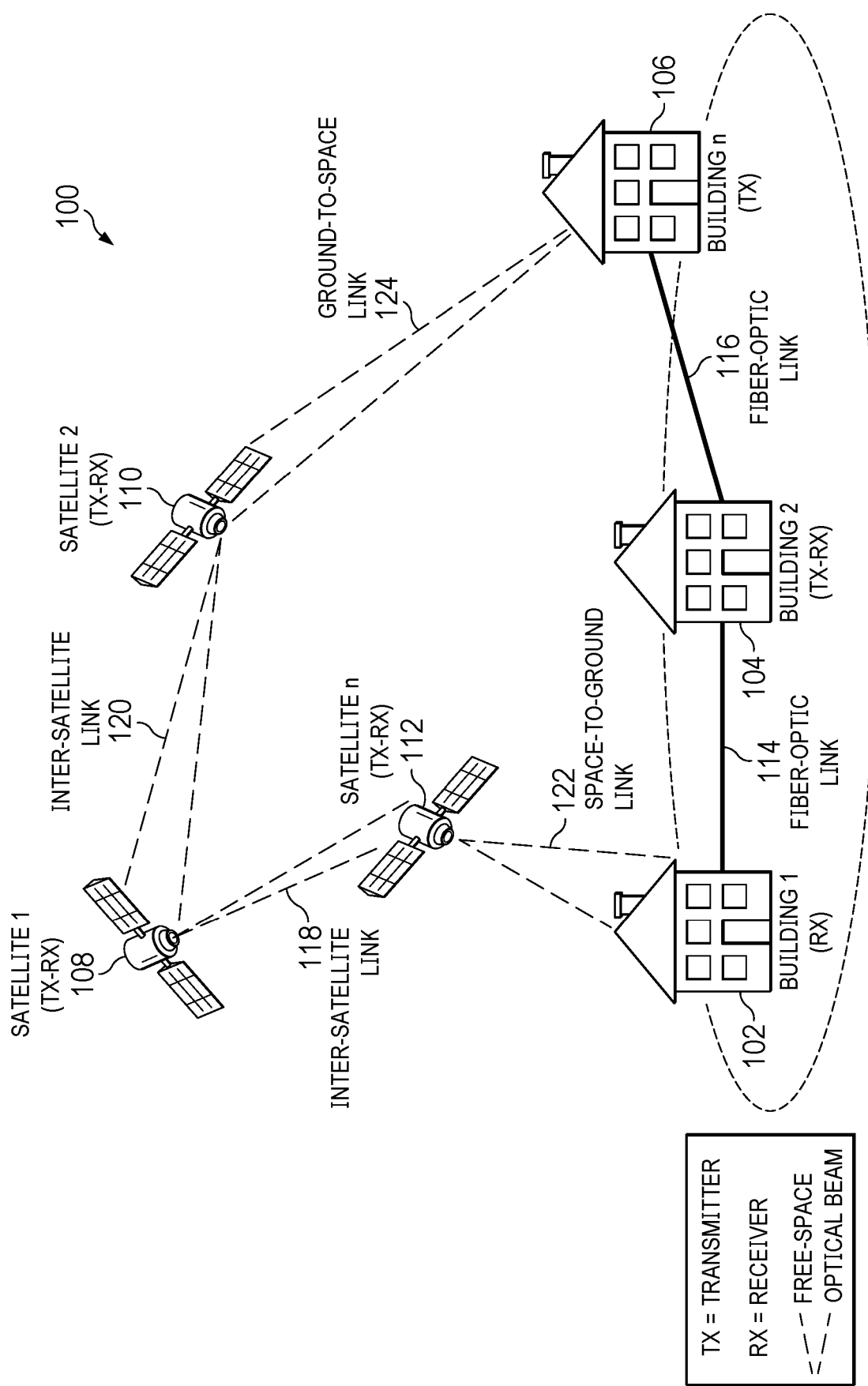
FIG. 1 is an illustration of a telecommunications system in accordance with an illustrative embodiment.

FIG. 1 is an illustration of a telecommunications system in accordance with an illustrative embodiment. Telecommunications system 100 comprises a number of ground stations 102, 104, 106 and a number of satellites 108, 110, 112.

Telecommunications system 100 includes a number of fiber-optic links 114, 116 connecting ground stations 102, 104, 106 and a number of inter-satellite links 118, 120 connecting satellites 108, 110, 112. Space-to-ground links 122, 124 connect the satellites 110 and 112 with the ground stations 106 and 102, respectively. In the example illustrated in FIG. 1, the inter-satellite links 118, 120 and space-to-ground links 122, 124 comprises free-space optical beams.

Ground stations 102, 104, 106 and satellites 108, 110, 112 may comprise a transmitter (TX), a receiver (RX), or both.

Figure 2:
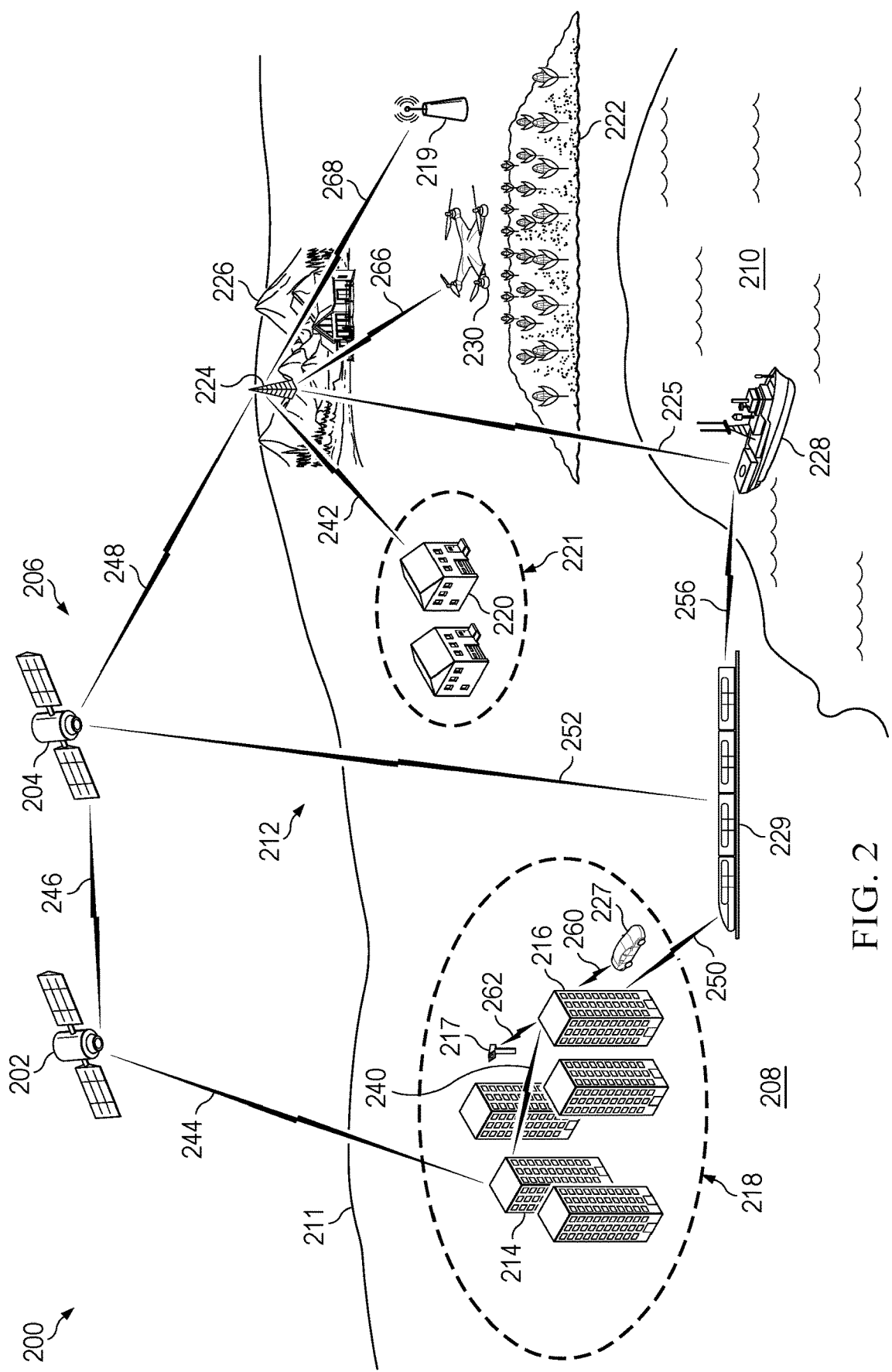
FIG. 2 is an illustration of a communications environment in which communications are facilitated using coherent optical signals modulated using radio frequency signals encoding data in accordance with an illustrative embodiment.

With reference to FIG. 2, an illustration of a communications environment in which communications are facilitated using coherent optical signals modulated using radio frequency signals encoding data is depicted in accordance with an illustrative embodiment. As depicted, communications environment 200 is an environment in which radio frequency signals encoding data can be encoded in coherent optical signals for transmission. This type of encoding of radio frequency signals encoded with data can increase at least one of the bandwidth or speed at which data can be transferred. For example, multiple radio frequency signals encoding data can be combined and used to modulate a coherent optical signal. This modulation of the coherent optical signal results in a modulated coherent optical signal that encode the radio frequency signals that are encoded with data. The different radio frequency signals encoding data can have different expanse. In other words, each of the radio frequency signals encoding data can occupy a different frequency range. In other words, these radio frequency signals can be transmitted in parallel within modulated coherent optical signals.

A using at least one of as used herein, "a number of" when used with reference to items, means one or more items. For example, "a number of different types of networks" is one or more different types of networks.

Further, the phrase "at least one of," when used with a list of items, means different combinations of one or more of the listed items can be used, and only one of each item in the list may be needed. In other words, "at least one of" means any combination of items and number of items may be used from the list, but not all of the items in the list are required. The item can be a particular object, a thing, or a category.

For example, without limitation, "at least one of item A, item B, or item C" may include item A, item A and item B, or item B. This example also may include item A, item B, and item C or item B and item C. Of course, any combinations of these items can be present. In some illustrative examples, "at least one of" can be, for example, without limitation, two of item A; one of item B; and ten of item C; four of item B and seven of item C; or other suitable combinations.

In this illustrative example, various platforms are present on which optical communication systems can be implemented for facilitating communication of data using coherent optical signals that are modulated with radio frequency signals encoding data. In this illustrative example, the data can take various forms. For example, the data can be voice communications, sensor data, commands, programs, transactions, messages, images, or other types of data.

As depicted, examples of platforms that can be used to facilitate optical communications in communications environment 200 include space platforms located in space 206. In this example, space 206 is the part of communications environment 200 that is beyond the Earth's atmosphere in this illustrative example. In this example, space 206 is not completely empty. In other words, space can still have a low density of particles such as a plasma of hydrogen and helium. Electromagnetic radiation, magnetic fields, neutrinos, dust, and cosmic rays can also be present in space 206. The demarcation where Earth's atmosphere ends may be not defined with a definite altitude above surface of the Earth. In another example, space 206 can be defined to begin at the Kármán line, which is about 100 km or 62 miles above sea level. The division between space 206 and Kármán line is a specific definition for where space 206 can begin as set by the Fédération aéronautique internationale (FAI).

Other platforms shown in communications environment 200 are terrestrial platforms. These terrestrial platforms are located within the Earth's atmosphere in this illustrative example. Some of these terrestrial platforms are located on land 208 or on water 210. In this example, other platforms can be located in air 212.

In this depicted example, space platforms in space 206 include, for example, satellite 202 and satellite 204. As shown in this illustrative example, terrestrial platforms on land 208 include office building 214, office building 216, signal light camera 217, and vehicle 227 in urban area 218. As depicted, terrestrial platforms can also include building 220 in suburban area 221.

As another example, terrestrial platforms can include sensor unit 219 in field 222. As another example, communications tower 224 in mountains 226 can also be used to facilitate optical communications. Ship 228 on water 210 can be an optical communication system. Unmanned aerial vehicle 230 in air 212 can also facilitate optical communications.

In this illustrative example, these different platforms can be used to establish communications links to communicate data in communications environment 200. The communications links can be established in a manner that facilitates at least one of increased efficiency or increased bandwidth in transmitting data as compared to current techniques.

For example, communications link 240 can be established in urban area 218 as point-to-point communications link that enables line of sight communications between office building 214 and office building 216 within a substantial number of buildings in urban area 218. This line of sight communications provided by communications link 240 within urban area 218 that can be more easily established as compared to current techniques that use radio frequency signals.

With the use of modulated coherent signals modulated using radio frequency signals encoding data, a smaller carrier wavelength is possible as compared to current techniques using radio frequency signals. As a result, receivers and transmitters for urban platforms such as office building 214 and office building 216 in urban area 218 can more easily transmit and receive these optical signals.

The use of these modulated optical signals can provide a well-defined propagation direction that results in easier relaying of signals around obstacles in urban area 218 as compared to current systems. Further, smaller transmitter and receiver units can be used on office building 214 and office building 216 to establish communications link 240 in these examples as compared to systems using radio frequency transmissions. In this example, communications link 240 can be a unidirectional or bidirectional communications link.

Further, modulated coherent optical frequency signals that are modulated using radio frequency signals encoding data can provide increased access and bandwidth for suburban area 221. For example, with current infrastructure in suburban area 221 and other remote areas may not have access to high-speed access lines such as optical fiber making communications in these areas unreliable and slow. Further, even the densely populated areas such as urban area 218, the "last mile" issue can result in slower than desired communications. Whether communications are considered slow or sufficiently fast can be defined using at least one of service level objectives (SLOs), service level agreements (SLAs), or other suitable standards.

As another example, communications link 244 can be used to exchange data between office building 214 and satellite 202. Communications link 246 is present between satellite 202 and satellite 204. Communications link 248 is present between satellite 204 and communications tower 224.

As depicted, building 220 has communications link 242 with communications tower 224. In this example, communications tower 224 also has communications link 225 with ship 228, communications link 266 with unmanned aerial vehicle 230, and communications link 268 with sensor unit 219. In this example, communications link 252 is between satellite 204 and train 229. Train 229 also has communications link 256 with ship 228 an communications link 250 with office building 216. Office building 216 also has communications link 262 with signal light camera 217 and communication link 260 with vehicle 227.

As depicted, these optical communications links can provide increased efficiency communicating data between the various platforms depicted in communications environment 200 through modulating coherent optical signals using radio frequency signals encoding the data in transmitting the modulated coherent optical signals from transmitter systems in the platforms to receiver systems in platforms that recover the radio frequency signals encoding data from the modulated coherent optical signals.

In the illustrative examples, adaptive receivers are present in the receiver systems to reduce issues that can be present with transmitting coherent optical signals through the atmosphere or through space. For example, the adaptive receivers in the receiver systems take into account variations in characteristics of the modulated coherent optical signals. For example, the adaptive receivers can take into account changes in intensity in the modulated coherent optical signals caused by atmospheric conditions such as rain, fog, pollution, volcanic ash, and other conditions that can cause attenuation and variation in the intensity of the modulated coherent optical signals that are received.

Figure 3:
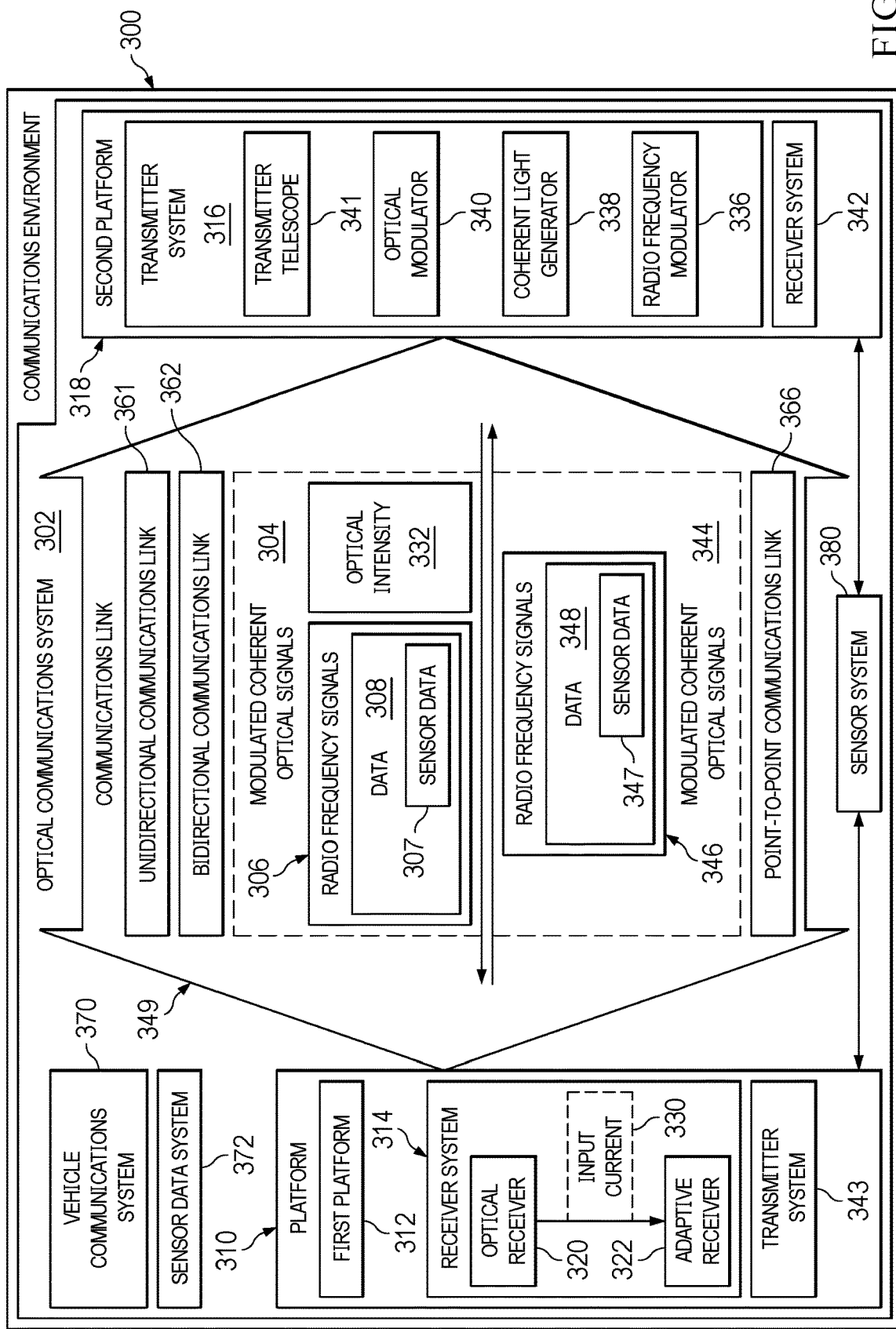
FIG. 3 is an illustration of a block diagram of a communications environment in accordance with an illustrative embodiment.

With reference now to FIG. 3, an illustration of a block diagram of a communications environment is depicted in accordance with an illustrative embodiment. In this illustrative example, communications environment 300 includes components that can be implemented in hardware such as the hardware shown in communications environment 200 in FIG. 2.

In this example, optical communications system 302 can facilitate communications using modulated coherent optical signals 304 that have been modulated using radio frequency signals 306 encoding data 308. In other words, radio frequency signals 306 can be modulated to encode data 308. Coherent optical signals can be modulated using radio frequency signals 306 encoding data 308 to form modulated coherent optical signals 304 modulated using radio frequency signals 306 encoding data 308.

In one illustrative example, platform 310 can be first platform 312 in which receiver system 314 is connected to platform 310 in optical communications system 302. Further in this example, transmitter system 316 can be connected to second platform 318 in optical communications system 302.

Figure 9:
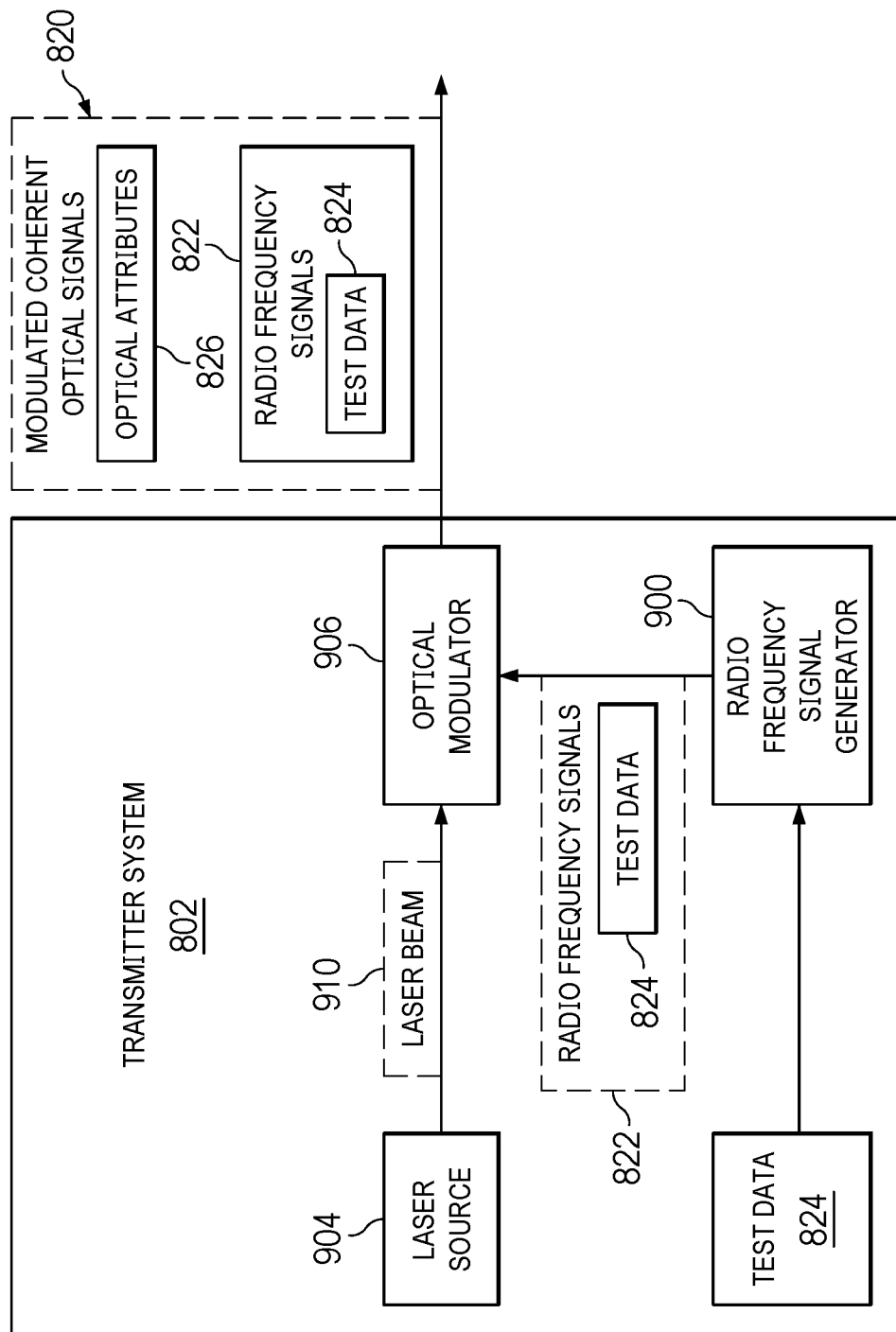
FIG. 9 is an illustration of a block diagram of a transmitter system in accordance with an illustrative embodiment.
Figure 10:
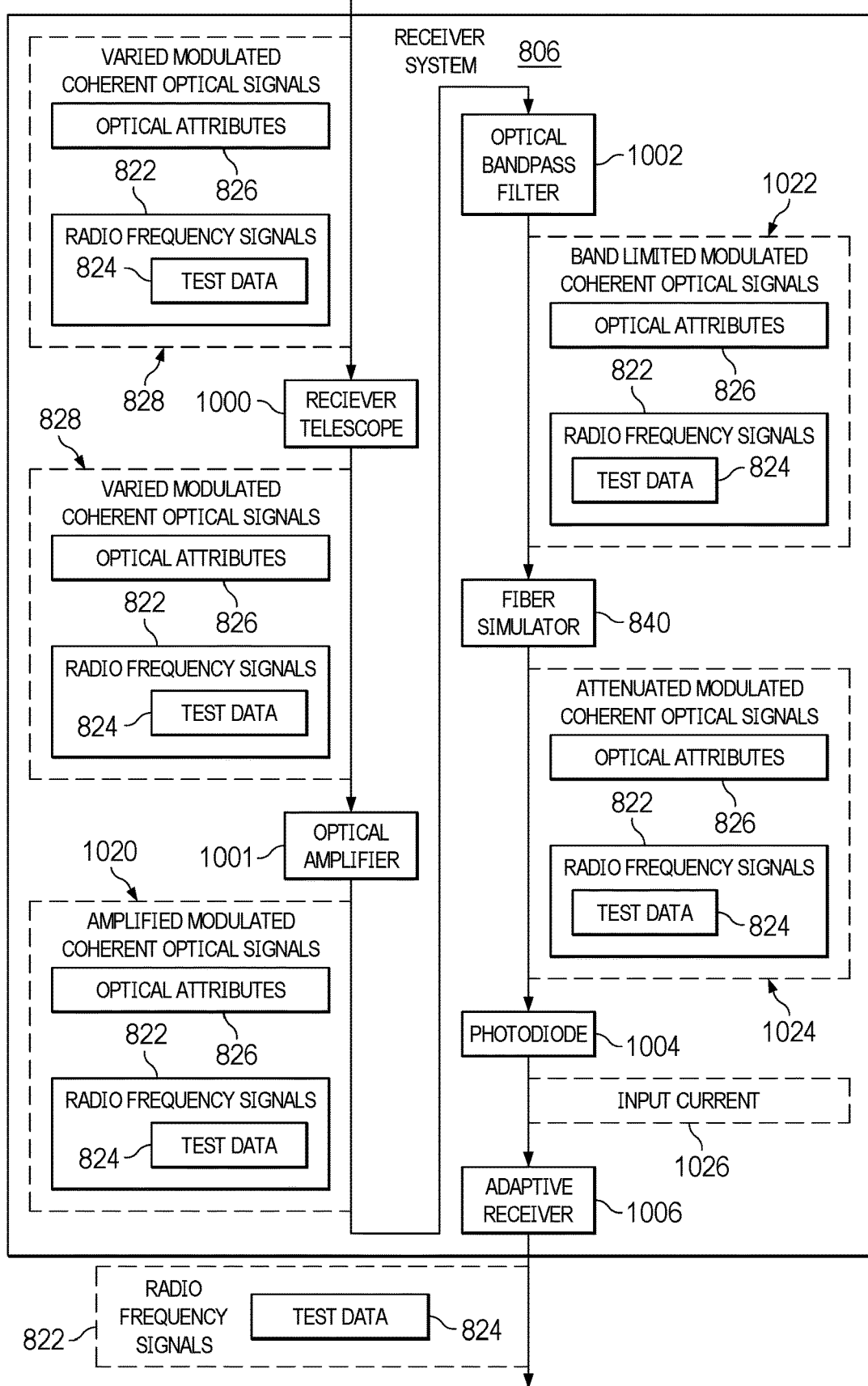
FIG. 10 is an illustration of a block diagram for a receiver system in accordance with an illustrative embodiment.

In this illustrative example, receiver system 314 can be implemented using receiver system 806 in FIG. 10. Also, transmitter system 316 can be implemented using transmitter system 802 in FIG. 9.

When one component is "connected" to another component, the connection is a physical connection. For example, a first component, such as receiver system 314, can be considered to be physically connected to a second component, first platform 312, by at least one of being secured to the second component, bonded to the second component, mounted to the second component, welded to the second component, fastened to the second component, or connected to the second component in some other suitable manner. The first component also can be connected to the second component using a third component. The first component can also be considered to be physically connected to the second component by being formed as part of the second component, an extension of the second component, or both.

As depicted, second platform 318 can transmit modulated coherent optical signals 304 using transmitter system 316. Modulated coherent optical signals 304 are coherent optical signals that are modulated using radio frequency signals 306 encoding data 308. In this example, the modulation is performed by modulating the intensity of the coherent optical signals.

In this example, modulated coherent optical signals 304 can be directed at first platform 312 and received by receiver system 314 in first platform 312. In response to receiving modulated coherent optical signals 304, receiver system 314 can process these optical signals to recover and output radio frequency signals 306 encoding data 308. Further, receiver system 314 can also recover data 308 encoded in radio frequency signals 306.

In this illustrative example, receiver system 314 comprises a number of different components. As depicted, receiver system 314 includes optical receiver 320 and adaptive receiver 322.

In this depicted example, optical receiver 320 receives modulated coherent optical signals 304 modulated using radio frequency signals 306 encoding data 308 and generates an input current 330 in response to receiving the modulated coherent optical signals 304. Input current 330 is an electrical current in these examples and can be generated using a device such as a photodetector.

As depicted, adaptive receiver 322 is connected to optical receiver 320 and receives input current 330 from optical receiver 320. An adaptive receiver connected to the optical receiver, wherein the adaptive receiver 322 recovers radio frequency signals 306 encoding data 308 from input current 330. This recovery of radio frequency signals 306 encoding data 308 is performed in a manner that adjusts for changes in the modulated coherent optical signals 304 caused by a variation in optical intensity 332 of modulated coherent optical signals 304 occurring during propagation of the modulated coherent optical signals 304. Adaptive receiver 322 outputs radio frequency signals 306 encoding data 308.

In some illustrative examples, optical receiver 320 can also recover data 308 from radio frequency signals 306 recovered from modulated coherent optical signals 304. For example, receiver system 314 can also include analog to digital converter that recovers data 308 from radio frequency signals 306.

Transmitter system 316 connected to second platform 318 encodes data 308 into radio frequency signals 306 and modulates coherent optical signal using radio frequency signals 306 encoding data 308 to form modulated coherent optical signals 304. Transmitter system 316 transmits modulated coherent optical signals 304 modulated using radio frequency signals 306 encoding data 308.

In this illustrative example, transmitter system 316 comprises a number of different components. As depicted, transmitter system 316 comprises radio frequency modulator 336, coherent light generator 338, optical modulator 340, and transmitter telescope 341.

In this example, radio frequency modulator 336 encodes data 308 in radio frequency signals 306. Coherent light generator 338 generates a coherent light. Coherent light generator 338 can be a laser beam generator in these examples. Optical modulator 340 modulates the coherent light using radio frequency signals 306 encoding data 308 to form modulated coherent optical signals 304. Transmitter telescope 341 transmits modulated coherent optical signals 304 modulated using radio frequency signals 306 encoding data 308.

In this illustrative example, first platform 312 can also have transmitter system 343 and second platform 318 can have receiver system 342. With these components, bidirectional communication can occur between first platform 312 and second platform 318. In this example, transmitter system 343 can generate modulated coherent optical signals 344 that have been modulated using radio frequency signals 346 encoding data 348.

Further, data 308 encoded in radio frequency signals 306 with radio frequency signals 306 used to modulate modulated coherent optical signals 304 and data 348 encoded in radio frequency signals 346 with radio frequency signals 346 used to modulate modulated coherent optical signals 344 can take selected from at least one of voice communications, sensor data, commands, programs, transactions, messages, images, or other types of data.

In the illustrative examples, the transmission of at least one of modulated coherent optical signals 304 or modulated coherent optical signals 344 can form communications link 349. In other words, communications link 349 can be unidirectional communications link 361 or bidirectional communications link 362 depending on the particular implementation. For example, with unidirectional communications link 361, modulated coherent optical signals 304 can be transmitted from second platform 318 to first platform 312 or modulated coherent optical signals 344 can be transmitted from first platform 312 to second platform 318. With bidirectional communications link 362, both modulated coherent optical signals 304 and modulated coherent optical signals 344 can be transmitted between these two platforms.

First platform 312 and second platform 318 can take a number different forms and can be used for many different types of applications in communications environment 300. For example, a platform, such as first platform 312 and second platform 318, can be selected one of a mobile platform, a stationary platform, a land-based structure, an aquatic-based structure, a space-based structure, an aircraft, a commercial aircraft, a rotorcraft, a tilt-rotor aircraft, a tilt wing aircraft, a vertical takeoff and landing aircraft, an electrical vertical takeoff and landing vehicle, a personal air vehicle, a surface ship, a tank, a personnel carrier, a train, a spacecraft, a space station, a satellite, a submarine, an automobile, a power plant, a bridge, a dam, a house, a manufacturing facility, a building, a utility pole, and a transmission tower.

In some illustrative examples, first platform 312 can be a terrestrial platform while second platform 318 can be a space platform. Communications link 349 can be used to provide indications between terrestrial locations. For example, first platform 312 can be example of satellite 204 in space 206 in FIG. 2 and second platform 318 can be an example of train 229 on land 208 in FIG. 2. In this manner, communications between space and terrestrial platforms can be performed using at least one of modulated coherent optical signals 344 and modulated coherent optical signals 344.

Further, communications link 349 can be a point-to-point communications link 366. For example, point-to-point communications link 366 can be an example of communications link 240 with first platform 312 being office building 214 and second platform 318 being office building 216.

When at least one of first platform 312 and second platform 318 takes the form of a vehicle, optical communications system is referred to as vehicle communications system 370. Vehicle communications system 370 is a system in which at least one of the platforms is a vehicle.

In another example, when sensor system 380 is used in at least one of first platform 312 or second platform 318, optical communications system 302 is sensor data system 372. Sensor data system 372 can take a number different forms. For example, sensor data system 372 can be comprised of at least one of at least one of a pressure sensor, a temperature sensor, a vibration sensor, a force sensor, an accelerometer, a humidity sensor, a camera, a pitot tube, a light detection and ranging sensor, a global positioning sensor device, a flow sensor, an eddy current sensor, or other sensor.

With this example, data 308 can be sensor data 307 and data 348 can be sensor data 347. For example, second platform 318 transmitting sensor data 307 can be unmanned aerial vehicle 230 or sensor unit 219 in FIG. 2. In this example, first platform 312 can be communications tower 224.

Sensor data 307 and sensor data 347 can take a number of different forms. For example, the sensor data can be selected from at least one of a temperature, a humidity, a pressure a proximity, a speed, a rotation, a chemical level, a gas level, a pH, a flow rate, and elevation, a location, and attitude, and orientation, an image, audio, or other parameters that can be measured or detected by sensor system 380.

Additionally, radio frequency signals 306 can be formed from set of radio frequency signals that in which each radio frequency signal has a different frequency range from another radio frequency signal. These radio frequency signals can be referred to as baseband signals and used to encode data. As a result, each of these baseband signals can encode different data from other baseband signals. In this manner, these radio frequency signals encoding can be combined to form radio frequency signals 306.

The illustration of communications environment 200 in FIG. 2 and communications environment 300 in FIG. 3 is not meant to imply physical or architectural limitations to the manner in which an illustrative embodiment may be implemented. Other components in addition to or in place of the ones illustrated may be used. Some components may be unnecessary. Also, the blocks are presented to illustrate some functional components. One or more of these blocks may be combined, divided, or combined and divided into different blocks when implemented in an illustrative embodiment.

For example, one or more platforms in addition to or in place of first platform 312 and second platform 318 can be present in communications environment 300. As yet another example, some platforms operating in water 210 can be subsurface platforms such as a submarine.

Figure 4:
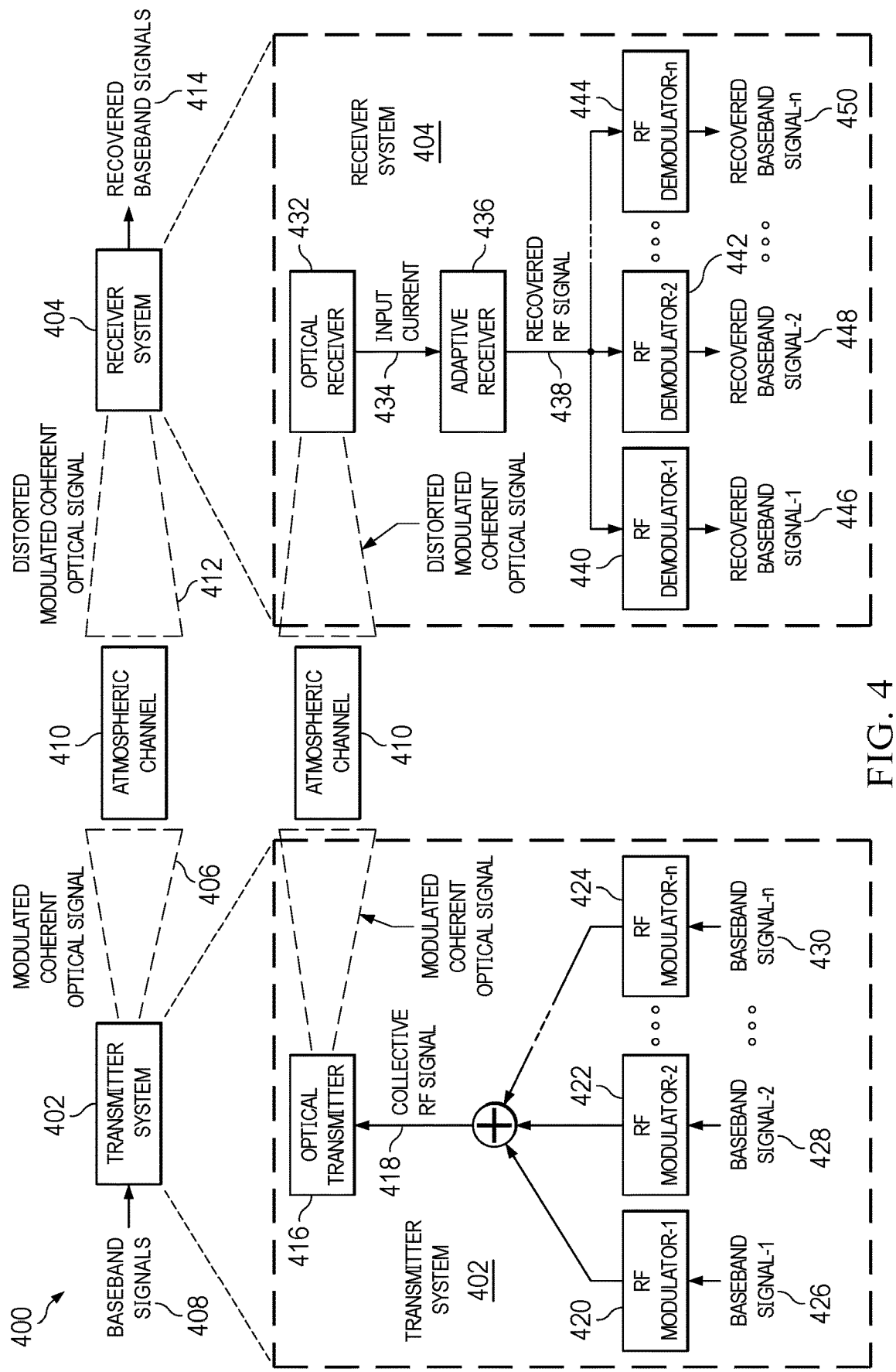
FIG. 4 is an illustration of a block diagram of a communications system in accordance with an illustrative embodiment.

FIG. 4 is an illustration of a block diagram of a communications system in accordance with an illustrative embodiment. Communications system 400 may be employed in communications environment 200 shown in FIG. 2 and communications environment 300 shown in FIG. 3.

Communications system 400 comprises transmitter system 402 and receiver system 404. In this example, transmitter system 402 and receiver system 404 can each be an integrated circuit. Transmitter system 402 generates a modulated coherent optical signal 406 from a number of baseband signals 408 encoding data. Baseband is the range of frequencies occupied by a signal that has not been modulated to higher frequencies. For example, human voice is a baseband signal that is modulated higher frequencies (i.e., RF) to send and receive it via telecommunications. This RF signal is modulated by the baseband (voice) signal. The modulated coherent optical signal 406 travels over an atmospheric channel 410, resulting in distorted modulated coherent optical signal 412. Receiver system 404 converts this distorted modulated coherent optical signal 412 back to recovered baseband signals 414 encoding the data.

Transmitter system 402 comprises an optical transmitter 416 that receives a collective RF signal 418 produced by multiplexing a number of RF signals from RF modulators 420, 422, 424. RF modulators 420, 422, 424 generate the RF signals from baseband signals 426, 428, 430, respectively.

Receiver system 404 comprises an optical receiver 432 that produces an input current 434 in response to the distorted modulated coherent optical signal 412. An adaptive receiver 436 converts the input current 434 into a recovered RF signal 438. The recovered RF signal 438 is demodulated by a number of RF demodulators 440, 442, 444 into respective recovered baseband signals 446, 448, 450.

Figure 5:
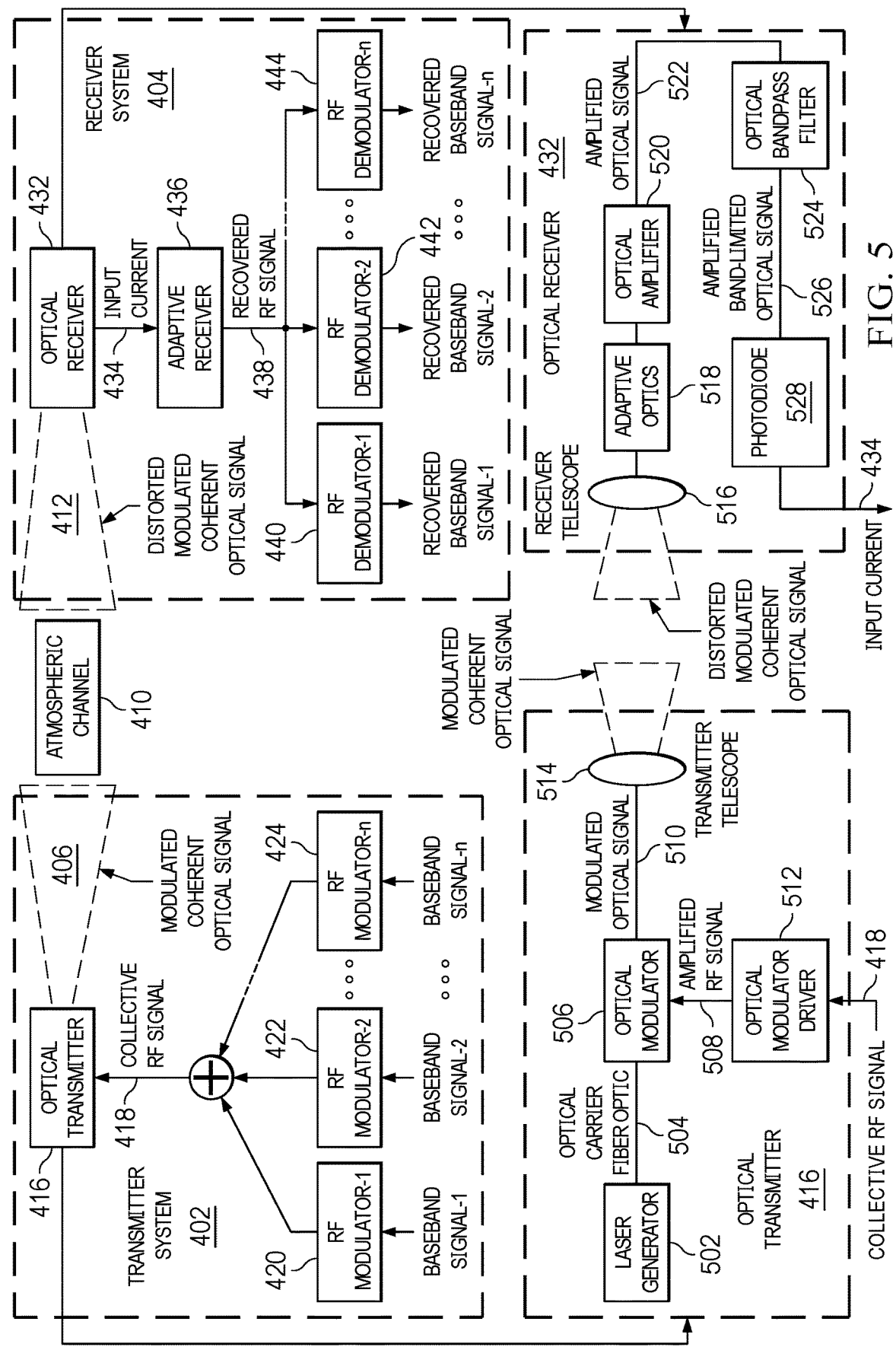
FIG. 5 is an illustration of a block diagram of a communications system depicting details of the optical transmitter and optical receiver in accordance with an illustrative embodiment.

FIG. 5 is an illustration of a block diagram of a communications system depicting details of the optical transmitter and optical receiver in accordance with an illustrative embodiment.

Optical transmitter 416 comprises a laser generator 502 that generates a coherent light (optical carrier) that travels along a fiber optic 504. Optical modulator 506 modulates the coherent light to encode an amplified RF signal 508 to a modulated coherent optical signal 510. The amplified RF signal 508 is generated by an optical modulator driver 512 from the collective RF signal 418. A transmitter telescope 514 transmits the modulated coherent optical signal 510 to optical receiver 432.

Optical receiver 432 comprises a receiver telescope 516 that receives the distorted modulated optical signal and passed it to adaptive optics 518. Adaptive optics 518 may comprise, for example, a number of corrective mirrors and a beam splitter for performing wavefront modification. The adaptive optics 518 pass the optical signal to optical amplifier 520, which produces an amplified optical signal 522. Optical bandpass filter 524 generates an amplified band-limited optical signal 526, which photodiode 528 uses to generate input current 434.

Figure 6:
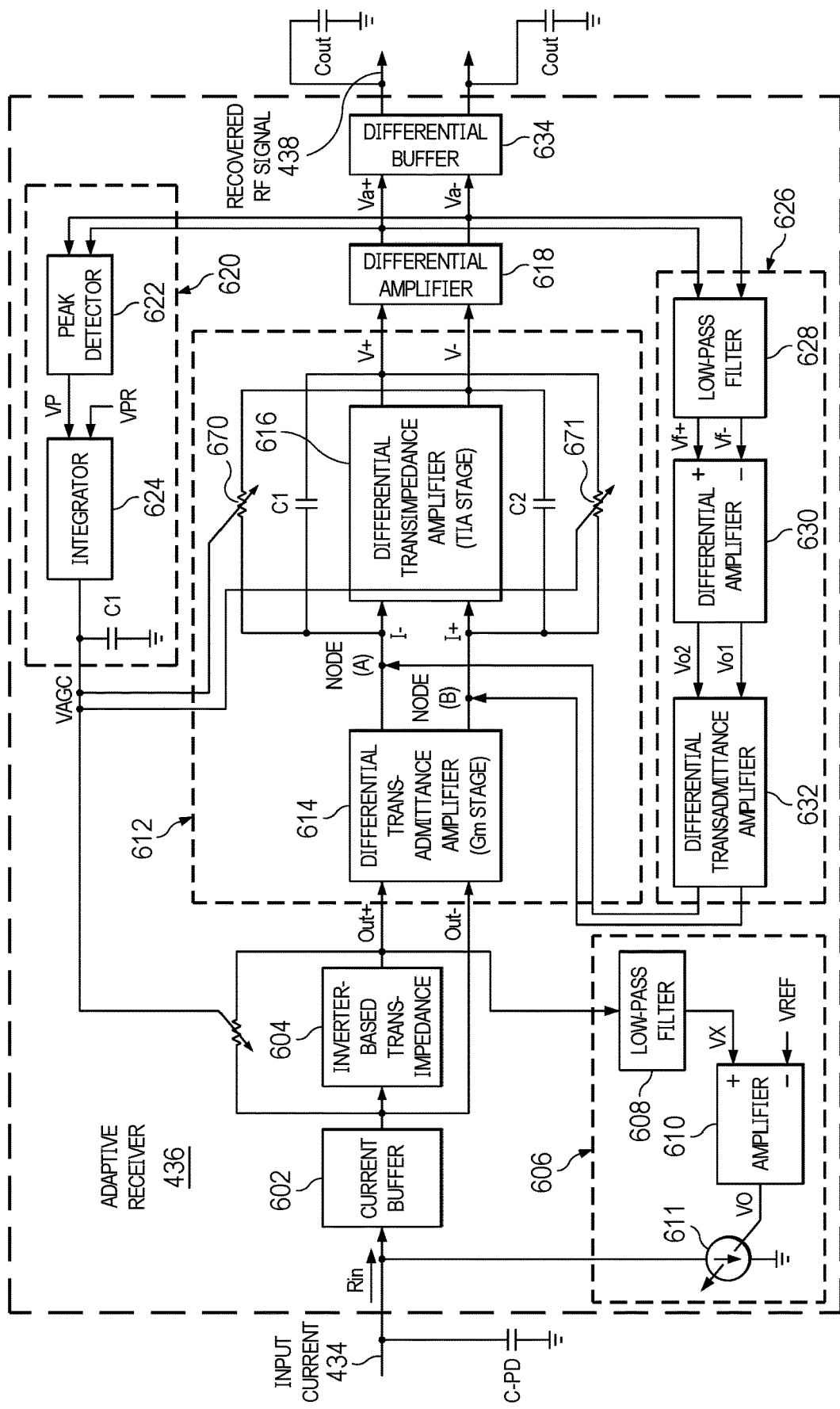
FIG. 6 is an illustration of a block diagram of an adaptive receiver integrated circuit in accordance with an illustrative embodiment.

FIG. 6 is an illustration of a block diagram of an adaptive receiver in accordance with an illustrative embodiment. FIG. 6 provides a more detailed view of the adaptive receiver 436 in FIG. 4.

Adaptive receiver 436 comprises a current buffer 602 that receives the input current 434 from photodiode 528. Adaptive receiver 436 may be implemented as an integrated circuit (IC). Current buffer 602 may be a feedback-applied current buffer that provides minimum impedance at the input node while consuming the least DC power.

An inverter-based transimpedance 604 receives input from the current buffer 602. Inverter-based transimpedance 604 may be a variable gain, inverter-based, transimpedance amplifier. In this example, the average current control loop 606 adaptively controls the average current into current buffer 602. An average current control loop 606 feeds back from the inverter-based transimpedance 604 to the current buffer 602. Average current control loop 606 comprises a low-pass filter 608, amplifier 610, and a voltage-controlled current source 611. The average current control loop 606 automatically subtracts the photodiode's excessive average current from the input node to avoid saturation of early stages of adaptive receiver 436.

In this illustrative example, the low-pass filter 608 has an input connected to an output of inverter-based transimpedance 604. The low-pass filter 608 receives a variable gain voltage (Out+) from inverter-based transimpedance 604 and outputs an average level of the variable gain voltage (Out+) as an average voltage (VX). The amplifier 610 has a first input that receives the average voltage (VX) from the low pass filter and a second input that receives a reference voltage (Vref). The amplifier 610 outputs an output voltage. The voltage output from the amplifier 610 becomes greater as the average voltage (VX) from the low-pass filter 608 becomes greater than reference voltage (Vref). The voltage-controlled current source 611 is controlled by the output voltage (VO) output from the amplifier. The voltage-controlled current source 611 reduces the average current into the current buffer 602 as the output voltage received from the amplifier increases.

In this example, the loop controls the output voltage (VX) from the low-pass filter 608 to be equal to the reference voltage (Vref). This reference voltage (Vref) can be set at conditions without turbulence or scintillation. These conditions can be optimum or desired conditions for the propagation of coherent light signals through the atmosphere.

Thus, the average current control loop 606 extracts the average level of the output voltage (Out+) output from inverter-based transimpedance 604 using low-pass filter 608 and comparing the voltage Out+ with the reference voltage (Vref). Low-pass filter 608 can be a passive low pass filter. The amplifier 610 amplifies the difference between the desired average voltage set by the reference voltage (Vref) and the average voltage (VX) and drives the voltage-controlled current source 611. For example, if output (VX) from the low-pass filter 608 is larger than the reference voltage (Vref), the amplifier 610 provides larger voltage to the voltage-controlled current source 611, which causes higher average current being drawn from the input node, leading to lower average current to the block current buffer 602. As a result, a lower average voltage (VX) is output by inverter-based transimpedance 604.

As result, in these illustrative examples, the average current control loop 606 provided feedback can automatically subtract the average current for input current 434 received from the photodiode to reduce the occurrence of saturation within adaptive receiver 436.

A variable gain circuit 612 receives input from the inverter-based transimpedance 604. Variable gain circuit 612 comprises a differential transadmittance (Gm) amplifier 614 that converts input voltage to current and a differential transimpedance amplifier 616 that converts the current back to voltage. The variable gain circuit 612 uses Miller capacitances C1, C2 to decrease total capacitance at output of the differential transadmittance amplifier, thereby increasing bandwidth. Based on the Miller theorem, when a capacitor is connected between input/output of an amplifier, the equivalent circuit is composed of two capacitors in the input and output as shown. If the gain A is positive, the input capacitor will be negative ($\approx$CM(−A)). Same in the circuit, the equivalent negative capacitances of C1 and C2 at nodes A and B will be added to the parasitic capacitances that already exist on these nodes and hence reduce the total capacitances in them making them non-dominant poles.

A differential voltage amplifier 618 receives input from the variable gain circuit 612. Output from the differential voltage amplifier 618 is fed into an automatic gain control loop 620 and offset cancellation loop 626.

Automatic gain control loop 620 comprises a peak detector 622 and an integrator 624. Automatic gain control loop 620 detects the peak of differential output of differential voltage amplifier 618 and generates the controlling voltage to the inverter-based transimpedance 604 and variable gain circuit 612.

As depicted, the peak detector 622 detects a peak voltage of a differential voltage (Va+ and Va−) output from the differential voltage amplifier 618. In this example, Va+ and Va− are amplified voltages V+ and V−. The differential voltage is the difference between Va+ and Va− output from differential voltage amplifier 618. Peak detector 622 outputs a peak voltage (VP) at a detector output. The peak voltage (VP) is the greatest differential voltage output by differential voltage amplifier 618.

The integrator 624 receives the peak voltage (VP) from the peak detector 622 and a reference peak voltage (VPR). The integrator 624 outputs an integrated gain controlling voltage signal (VAGC) that controls a peak-to-peak value of the differential voltage output by the variable gain circuits.

In this example, the variable gain circuits are inverter-based transimpedance 604 and differential transimpedance amplifier 616. As depicted, metal-oxide-semiconductor field-effect transistor (MOSFET) 670 and metal-oxide-semiconductor field-effect transistor (MOSFET) 671 are used to change the resistance to control the gain. For example, increased resistance increases the gain through the circuits. Decreasing the resistance decreases the gain for the circuits. When peak voltage (VP) is greater than reference peak voltage (VPR), the gain is reduced for both inverter-based transimpedance 604 and differential transimpedance amplifier 616. In this manner, the situation in which nonlinearity occurs in these circuits can be reduced or avoided. In this example, reference peak voltage (VPR) is set at a voltage to cause a reduction gain when peak voltage (VP) is higher than the reference peak voltage (VPR).

As result, automatic gain control loop 620 can reduce errors or distortions in the recovery of coherent light signals modulated with radio frequency signals encoding data caused by atmospheric conditions. For example, turbulence or other atmospheric conditions can cause the peak-to-peak level of the received signal to vary. As a result, when the adaptive receiver 436 detects the incoming coherent light has very high amplitude, the variable gain circuits in the adaptive receiver 436 can leave the linear region and enter the non-linear region.

In this example, automatic gain control loop 620 can operate to avoid this situation. As a result, a loss of information caused by operating in a nonlinear region can be reduced or avoided. In these examples, when a circuit operates in a nonlinear region, radio frequency signal encoding data in the noncoherent light can be clipped, resulting in reduced quality of the signal and potential loss of data.

Thus, the automatic gain control loop 620 extracting the peak voltage (VP) for the output voltage of differential voltage amplifier 618 using a peak detector 622 and comparing the peak voltage (VP) with a preset reference peak voltage (VPR). The result of this comparison is integrated in a capacitor C1 and generates the gain controlling voltage (VAGC). If the peak voltage (VP) is higher than preset reference voltage (VPR), the gain controlling voltage (VAGC) reduces the gain of inverter-based transimpedance 604 and the variable gain circuit 612 by decreasing the variable resistors in the feedback of these components. As a result, the gain can be reduced and a lower peak voltage (VP) is achieved such that the operation of these components can be within the desired operating range to reduce data loss.

The offset cancellation loop 626 averages the voltages received from differential voltage amplifier 618. The offset cancellation loop 626 comprises a low-pass filter 628, a second differential amplifier, 630 and a differential transadmittance (Gm) amplifier 632. Offset cancellation loop 626 feeds back from the differential voltage amplifier 618 to variable gain circuit 612 and uses the differential transadmittance amplifier 632 to draw the corrective currents from the differential transadmittance amplifier 614 output. In this example, the offset cancellation loop 626 feeds back from the differential voltage amplifier 618 to the variable gain circuit 612 that adaptively controls a bias point of the differential voltage amplifier 618 to obtain a desired bias point for the differential voltage amplifier 618. The control of the bias point can be set to obtain the highest quality signal in terms of the allowed swing and also improving linearity in the operation of the differential stages, the variable gain circuit 612, the differential voltage amplifier 618, and the differential buffer 634. Without maintaining a desired level for the bias point, the top or bottom of the signal may be clipped resulting in data loss.

As depicted, the low-pass filter 628 receives the differential voltage output from the differential voltage amplifier 618. The differential voltage is the difference between Va+ and Va−. In this example Va+ and Va− are amplified voltages V+ and V− output from differential voltage amplifier 618. Low-pass filter 628 outputs filtered voltages (Vf+ and Vf−) that are averages of the differential voltage voltages Va+ and Va−. Differential amplifier 630 receives the average outputs (Vf+ and Vf−) from low-pass filter 628. Differential amplifier 630 outputs amplified difference voltages (Vo1 and Vo2).

In this example, the differential transadmittance amplifier 632 receives the amplified difference voltages (Vo1 and Vo2) output from the differential amplifier 630. The differential transadmittance amplifier 632 is connected to outputs of differential transadmittance amplifier 614, in the variable gain circuit 612 that controls the bias point of the differential voltage amplifier 618. A differential buffer 634 receives input from the differential voltage amplifier 618 and outputs the recovered RF signal 438. In this example, the differential buffer 634 outputs a recovered RF signal 438 encoding data. The differential buffer 634 has inductive load to interface the adaptive receiver 436 to measurement equipment while providing inductive peaking for bandwidth enhancement.

Thus, the offset cancellation loop 626 extracts the average voltage level (Vf+ and Vf−) of each output voltage (Va+ and Va−) from the differential voltage amplifier 618 and amplifies the difference between these output voltages (Vf+ and Vf−) to output amplified voltages (Vo1 and Vo2. The difference between these two voltages (Vo2−Vo1) is the amplified offset voltage of the signal at the output of differential voltage amplifier 618. This differential voltage (Vo2−Vo1) is converted to a differential current using a Gm stage, differential transadmittance amplifier 632, and supplies or subtracts corrective currents to/from node A and B in the variable gain circuit 612 until the average level of differential voltage amplifier 618 differential voltages output by differential voltage amplifier 618 equal each other, resulting in a zero offset.

Figure 7:
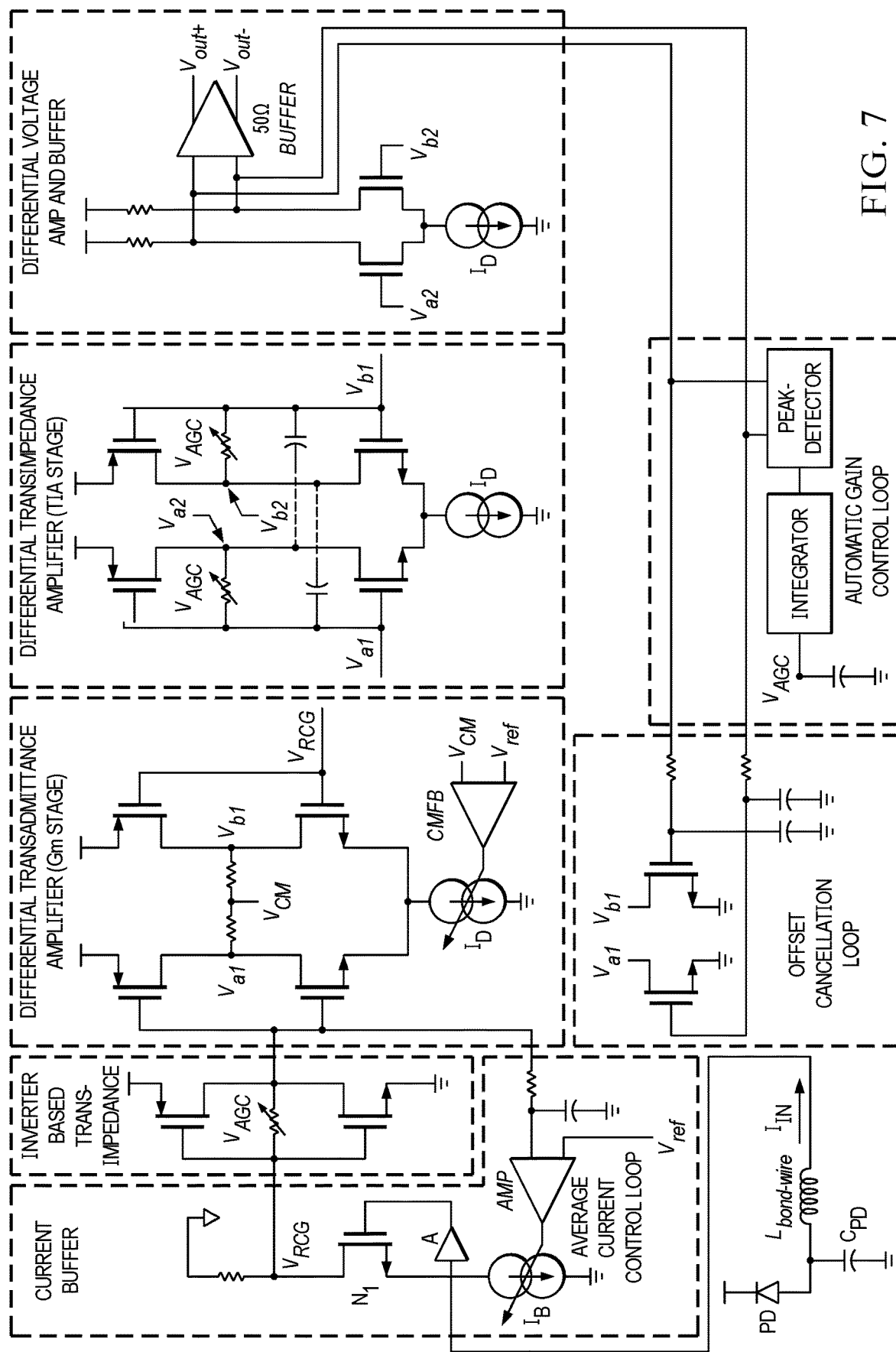
FIG. 7 is an illustration of a circuit diagram of an example implementation of the adaptive receiver integrated circuit in accordance with an illustrative embodiment.

FIG. 7 is an illustration of a circuit diagram of an example implementation of the adaptive receiver 436 in accordance with an illustrative embodiment.

Figure 8:
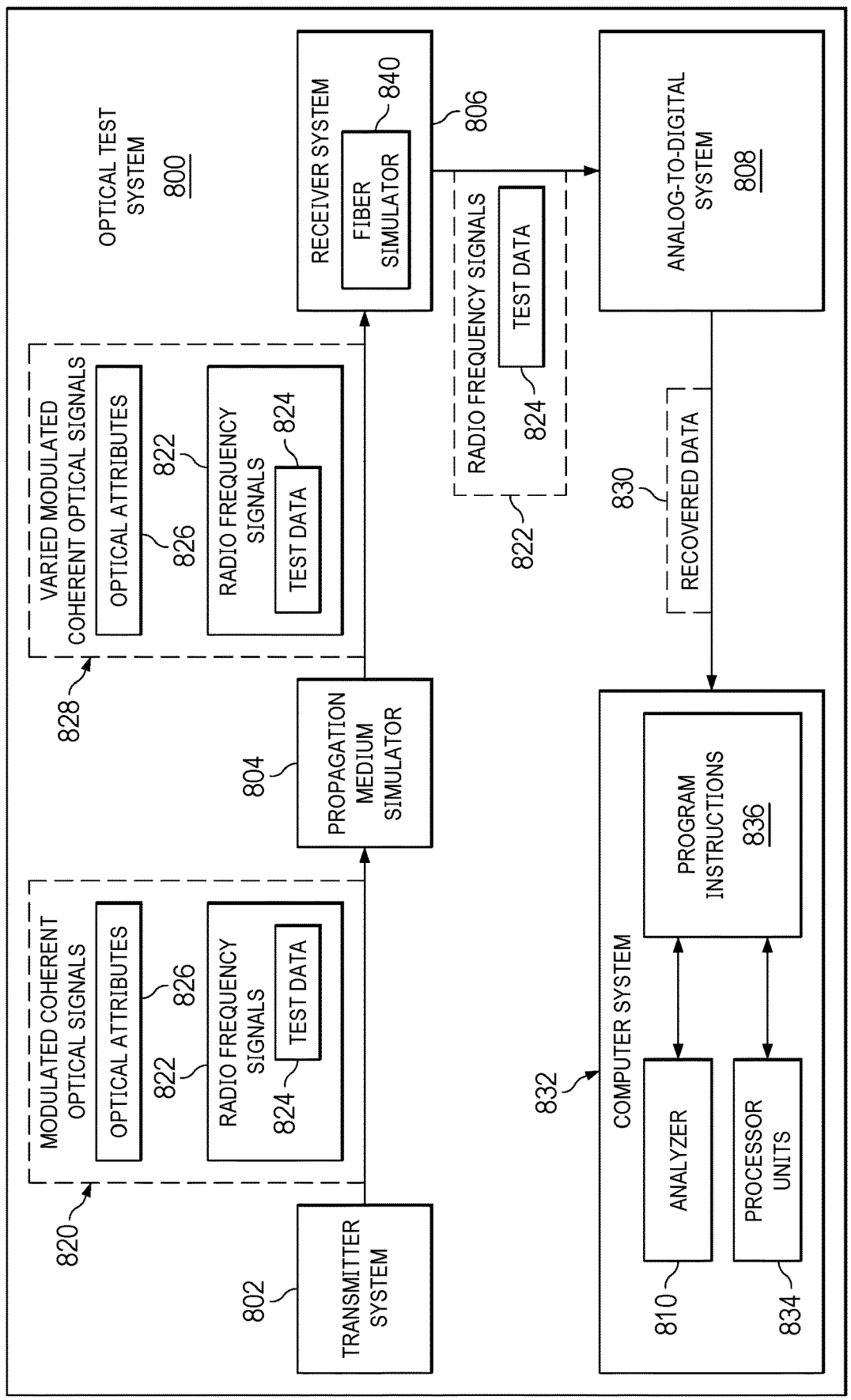
FIG. 8 is an illustration of a block diagram of an optical test system is depicted in accordance with an illustrative embodiment.

With reference next to FIG. 8, an illustration of a block diagram of an optical test system is depicted in accordance with an illustrative embodiment. In this illustrative example, optical test system 800 is an example of a test system that can be used to test and adjust components can receiver, such as adaptive receiver 436 in receiver system 404 in FIG. 4.

In this illustrative example, optical test system 800 comprises a number of different components. As depicted, optical test system 800 comprises transmitter system 802, propagation medium simulator 804, receiver system 806, analog-to-digital (ADC) system 808, and analyzer 810.

In this illustrative example, transmitter system 802 transmits modulated coherent optical signals 820 that have been modulated using radio frequency signals 822 encoding test data 824. In other words, radio frequency signals 822 encoding test data 824 are encoded in modulated coherent optical signals 820.

As depicted, propagation medium simulator 804 receives modulated coherent optical signals 820 from transmitter system 802. Propagation medium simulator 804 changes a set of optical attributes 826 for modulated coherent optical signals 820 to model propagation of modulated coherent optical signals 820 through propagation environment to form varied modulated coherent optical signals 828 and outputs varied modulated coherent optical signals 828. As depicted, varied modulated coherent optical signals 828 encode radio frequency signals 822 encoding test data 824.

In this example, the change in the set of optical attributes 826 can include a variation in optical intensity. Other attributes that can be changed include, for example, a phase, the wavelength, or other attributes for modulated coherent optical signals 820.

In this example, receiver system 806 receives varied modulated coherent optical signals 828 from propagation medium simulator 804. Receiver system 806 recovers radio frequency signals 822 encoding test data 824 from varied modulated coherent optical signals 828 in a manner that adjusts for changes in the varied modulated coherent optical signals 828 caused by variation in the set of optical attributes 826 in varied modulated coherent optical signals 828 generated by the propagation medium simulator 804. As depicted, receiver system 806 outputs radio frequency signals 822 encoding test data 824 recovered from varied modulated coherent optical signals 828.

In this example, analog to digital system 808 can extract test data 824 from radio frequency signals 822, and outputs recovered data 830. In this example, analyzer 810 can compare recovered data 830 with test data 824 used to modulate radio frequency signals 822 to encode test data 824 in radio frequency signals 822

In this illustrative example, analyzer 810 is located in computer system 832. Computer system 832 is a physical hardware system and includes one or more data processing systems. When more than one data processing system is present computer system 832, those data processing systems are in communication with each other using a communications medium. The communications medium may be a network. The data processing systems may be selected from at least one of a computer, a server computer, a tablet, or some other suitable data processing system.

As depicted, computer system 832 includes a number of processor units 834 that are capable of executing program instructions 836 implementing processes such as those for analyzer 810 in the illustrative examples. In other words, program instructions 836 are computer readable program instructions.

As used herein, a processor unit in the number of processor units 834 is a hardware device and is comprised of hardware circuits such as those on an integrated circuit that respond to and process instructions and program code that operate a computer. When the number of processor units 834 executes program instructions 836 for a process, the number of processor units 834 can be one or more processor units that are on the same computer or on different computers. In other words, the process can be distributed between processor units 834 on the same or different computers in a computer system 832. Further, the number of processor units 834 can be of the same type or different type of processor units. For example, a number of processor units 834 can be selected from at least one of a single core processor, a dual-core processor, a multi-processor core, a general-purpose central processing unit (CPU), a graphics processing unit (GPU), a digital signal processor (DSP), or some other type of processor unit.

In the depicted example, optical test system 800 can also include fiber simulator 840. In this example, fiber simulator 840 can be located within receiver system 806 and can simulate a change in the set of optical attributes 826 to model propagation of the modulated coherent optical signals through a set of optical fibers. For example, fiber simulator 840 can simulate losses such as those in signal amplitude from modulated coherent signals traveling through a set of optical fibers.

With reference next to FIG. 9, an illustration of a block diagram of a transmitter system is depicted in accordance with an illustrative embodiment. In this illustrative example, an example of an implementation for transmitter system 802 in optical test system 800 in FIG. 8 is illustrated. As depicted in this example, transmitter system 802 comprises radio frequency signal generator 900, laser source 904, and optical modulator 906.

Radio frequency signal generator 900 can generate radio frequency signals 822 encoding test data 824. These radio frequency signals encoding test data 824 are sent to optical modulator 906 which modulates laser beam 910 generated by laser source 904. The modulation of laser beam 910 generates modulated coherent optical signals 820 that are modulated using radio frequency signals 822 encoding test data 824. These modulated coherent optical signals can then be sent to propagation medium simulator 804.

Tuning to FIG. 10, an illustration of a block diagram for a receiver system is depicted in accordance with an illustrative embodiment. In this illustrative example, an example of an implementation for receiver system 806 in optical test system 800 in FIG. 8 is illustrated. As depicted in this example, receiver system 806 comprises receiver telescope 1000, optical amplifier 1001, optical bandpass filter 1002, photodiode 1004, adaptive receiver 1006. As depicted, fiber simulator 840 connects optical bandpass filter 1002 to photodiode 1004.

As depicted, receiver telescope 1000 comprises optics and other components that receive varied modulated coherent optical signals 828 from propagation medium simulator 804. In this illustrative example, receiver telescope 1000 sends varied modulated coherent optical signals 828 to optical amplifier 1001. Optical amplifier 1001 amplifies varied modulated coherent optical signals 828 to form amplified modulated coherent optical signals 1020. These amplified signals are output and sent to optical bandpass filter 1002.

Optical bandpass filter 1002 receives amplified modulated coherent optical signals 1020 and filters amplified modulated coherent optical signals 1020 to form band limited modulated coherent optical signals 1022 that encodes radio frequency signals 822 encoding test data 824. In this example, optical bandpass filter 1002 passes a range of frequencies in which radio frequency signals 822 encoding test data 824 are expected to be present within the modulated optical signals.

In this illustrative example, band limited modulated coherent optical signals 1022 are received by fiber simulator 840. In this example, fiber simulator 840 changes the set of optical attributes 826 in band limited modulated coherent optical signals 1022 to model propagation of the modulated coherent optical signals through a set of optical fibers. In this example, fiber simulator 840 outputs attenuated modulated coherent optical signals 1024. This change to the set of optical attributes 826 can be used to model losses such as those in signal amplitude from optical signals traveling through optical fibers.

In this example, photodiode 1004 receives attenuated modulated coherent optical signals 1024 from fiber simulator 840 and generates input current 1026 in response to detecting attenuated modulated coherent optical signals 1024. Input current 1026 is sent to adaptive receiver 1006. Which recovers radio frequency signals 822 encoding test data 824.

In this illustrative example, propagation medium simulator 804 and fiber simulator 840 can set modulated optical attributes 826 to simulate ideal or desired conditions for operating receiver system 806. Under these ideal conditions, various outputs for components within adaptive receiver 1006 can be used to select voltages for operating the adaptive receiver 1006.

For example, an average current control loop in adaptive receiver 1006 can have a reference voltage for an amplifier in the average current control loop used as a reference voltage for that amplifier output under the desired or ideal conditions. As another example, in an automatic gain control loop in adaptive receiver 1006, the reference peak voltage for an integrator in the automatic gain control loop can have its reference voltage set as the peak voltage of the differential voltage output by the integrator under the desired conditions.

Figure 11:
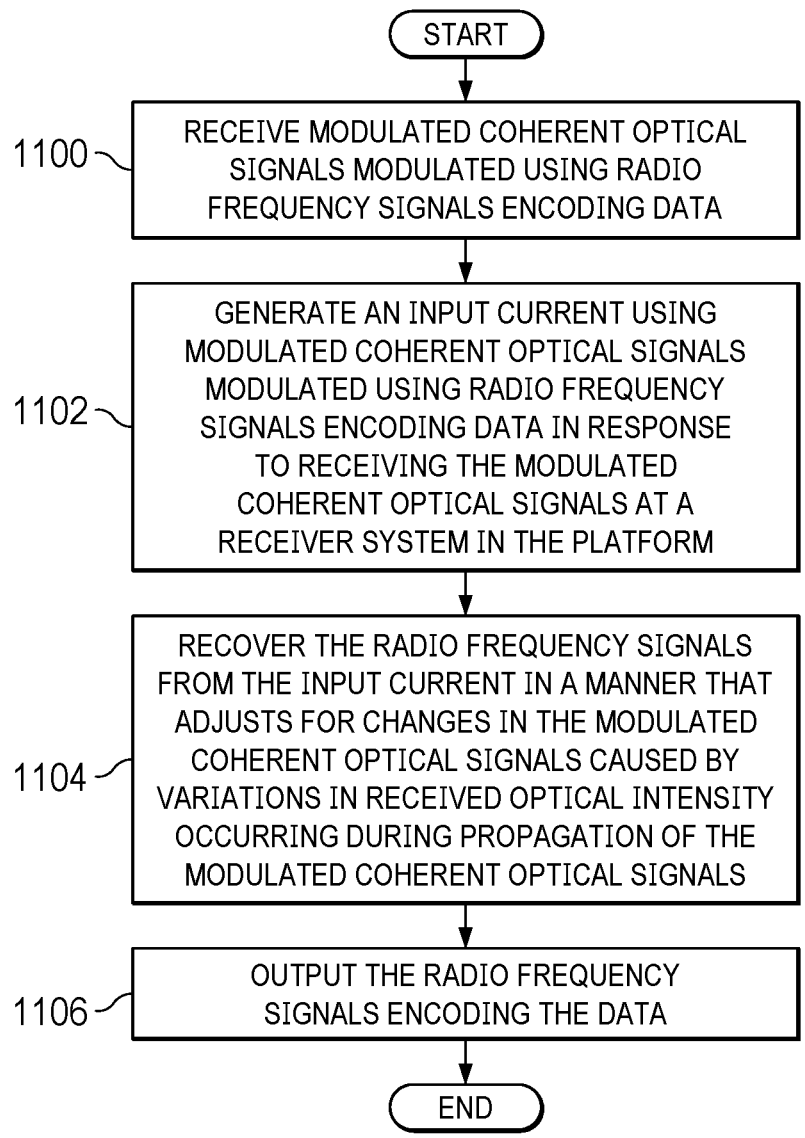
FIG. 11 is a flowchart of a process for method for communicating data with a platform in accordance with an illustrative embodiment.

Turning next to FIG. 11, a flowchart of a process for method for communicating data with a platform is depicted in accordance with an illustrative embodiment. The process in FIG. 11 can be implemented in hardware, software, or both. When implemented in software, the process can take the form of program instructions that is run by one of more processor units located in one or more hardware devices in one or more computer systems. For example, the process can be implemented in platform 310 which can be first platform 312 using receiver system 314 in FIG. 3.

The process begins by receiving modulated coherent optical signals modulated using radio frequency signals encoding data (operation 1100). The process generates an input current using modulated coherent optical signals modulated using radio frequency signals encoding data in response to receiving the modulated coherent optical signals at a receiver system in the platform (operation 1102). The process recovers the radio frequency signals from the input current in a manner that adjusts for changes in the modulated coherent optical signals caused by variations in received optical intensity occurring during propagation of the modulated coherent optical signals (operation 1104).

The process outputs the radio frequency signals encoding the data (operation 1106). The process terminates thereafter.

Figure 12:
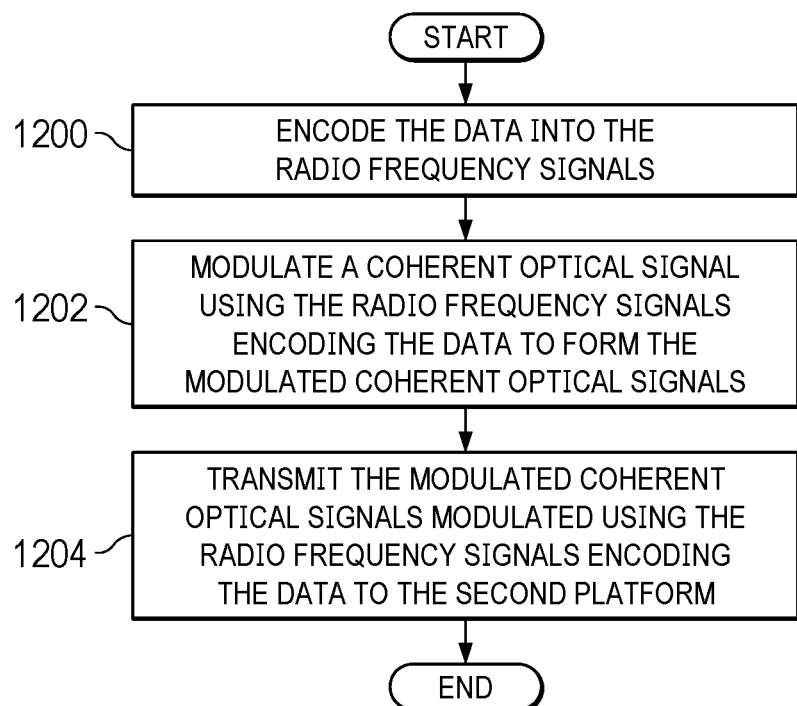
FIG. 12 is a flowchart of a process for method for communicating data with a platform in accordance with an illustrative embodiment.

With reference to FIG. 12, a flowchart of a process for method for communicating data with a platform is depicted in accordance with an illustrative embodiment. The process in FIG. 12 can be implemented in hardware, software, or both. When implemented in software, the process can take the form of program instructions that is run by one of more processor units located in one or more hardware devices in one or more computer systems. For example, the process can be implemented in second platform 318 using transmitter system 316 in FIG. 3. The operations in this flowchart can be additional operations performed with the operations depicted in FIG. 11.

The process begins by encoding the data into the radio frequency signals (operation 1200). The process modulates a coherent optical signal using the radio frequency signals encoding the data to form the modulated coherent optical signals (operation 1202).

The process transmits the modulated coherent optical signals modulated using the radio frequency signals encoding the data to the second platform (operation 1204). The process terminates thereafter.

Figure 13:
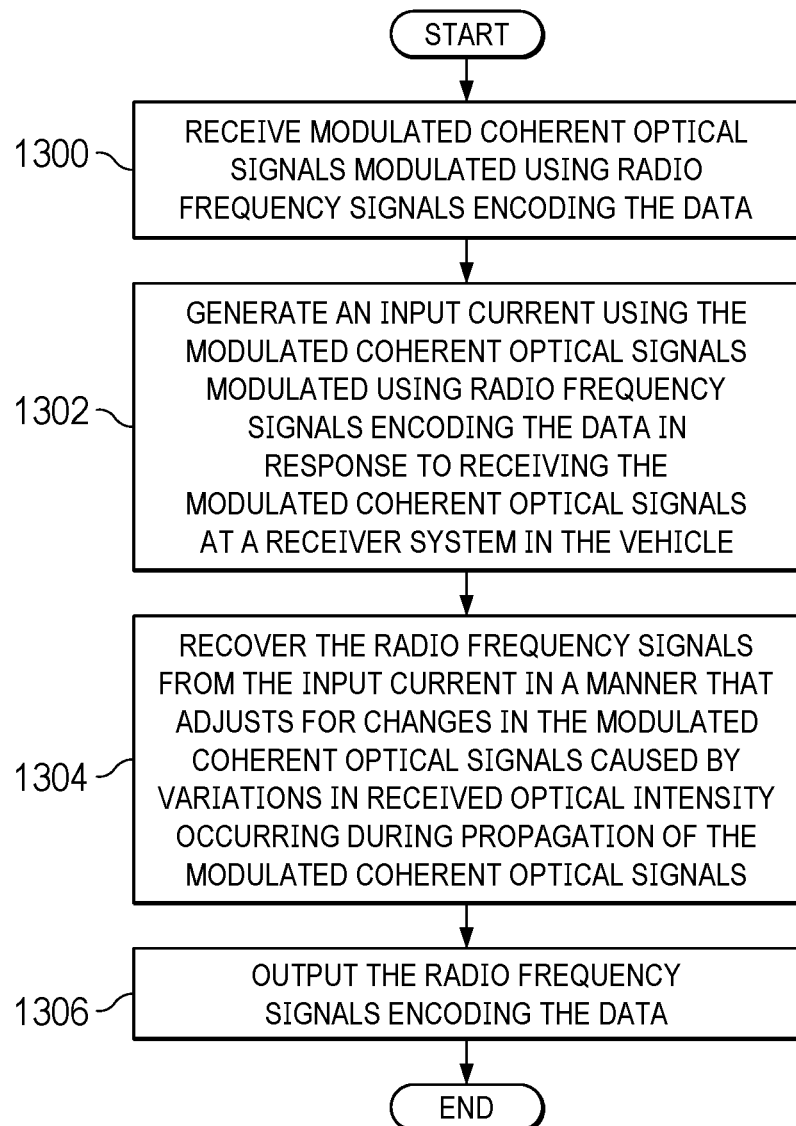
FIG. 13 is a flowchart of a process for method for communicating data with a vehicle in accordance with an illustrative embodiment.

Turning to FIG. 13, a flowchart of a process for method for communicating data with a vehicle is depicted in accordance with an illustrative embodiment. The process in FIG. 13 can be implemented in hardware, software, or both. When implemented in software, the process can take the form of program instructions that is run by one of more processor units located in one or more hardware devices in one or more computer systems. For example, the process can be implemented in first platform 312 using receiver system 314 in FIG. 3.

The process begins by receiving modulated coherent optical signals modulated using radio frequency signals encoding the data (operation 1300). The process generates an input current using the modulated coherent optical signals modulated using radio frequency signals encoding the data in response to receiving the modulated coherent optical signals at a receiver system in the vehicle (operation 1302). The process recovers the radio frequency signals from the input current in a manner that adjusts for changes in the modulated coherent optical signals caused by variations in received optical intensity occurring during propagation of the modulated coherent optical signals (operation 1304).

The process outputs the radio frequency signals encoding the data (operations 1306). The process terminates thereafter.

Figure 14:
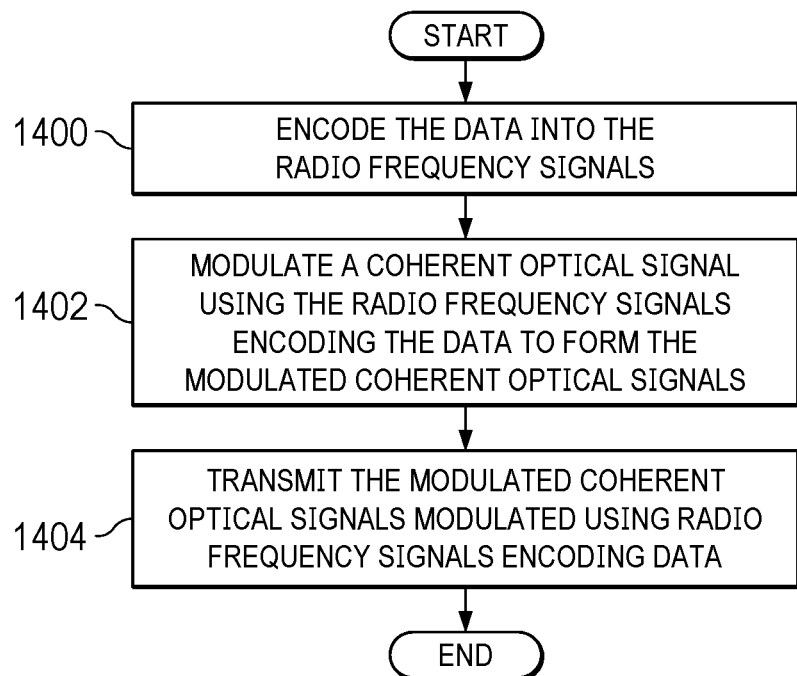
FIG. 14 is a flowchart of a process for method for communicating data with a vehicle in accordance with an illustrative embodiment.

With reference to FIG. 14, a flowchart of a process for method for communicating data with a vehicle is depicted in accordance with an illustrative embodiment. The process in FIG. 14 can be implemented in hardware, software, or both. When implemented in software, the process can take the form of program instructions that is run by one of more processor units located in one or more hardware devices in one or more computer systems. For example, the process can be implemented in second platform 318 using transmitter system 316 in FIG. 3. The operations in this flowchart can be additional operations performed with the operations depicted in FIG. 13.

The process begins by encoding the data into the radio frequency signals (operation 1400). The process modulates a coherent optical signal using the radio frequency signals encoding the data to form the modulated coherent optical signals (operation 1402).

The process transmits the modulated coherent optical signals modulated using radio frequency signals encoding data (operation 1404). The process terminates thereafter.

Figure 15:
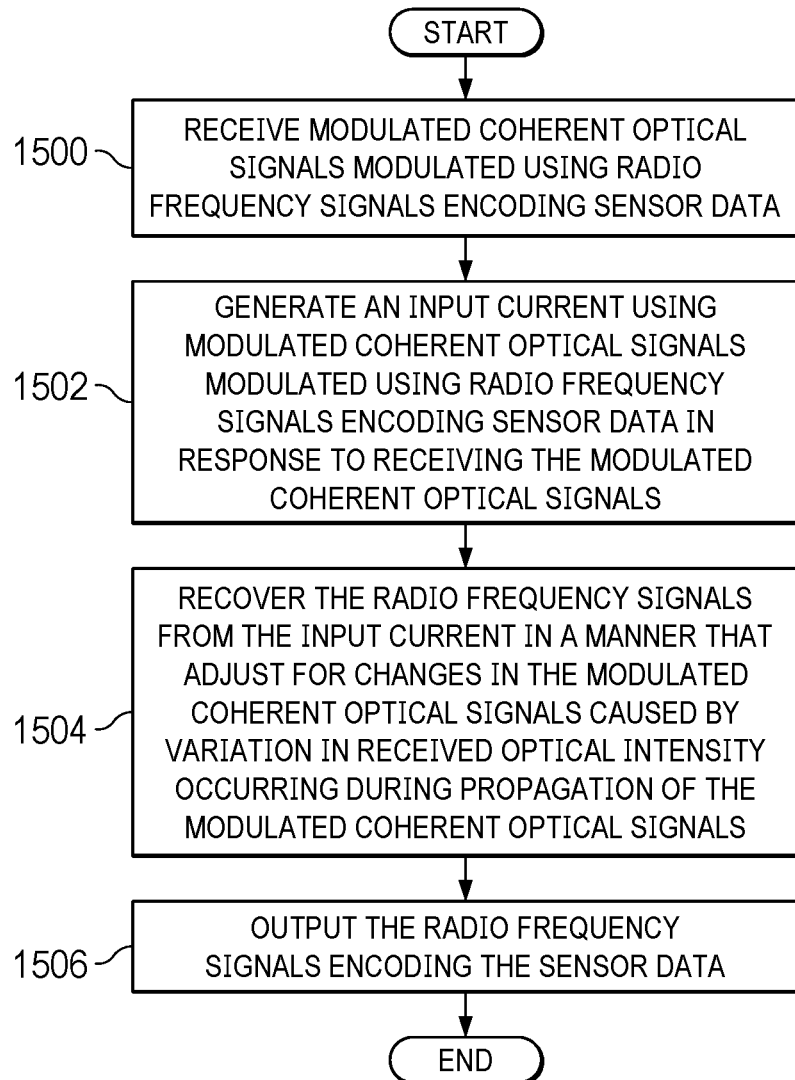
FIG. 15 is a flowchart of a process for method for communicating sensor data in accordance with an illustrative embodiment.

In FIG. 15, a flowchart of a process for method for communicating sensor data is depicted in accordance with an illustrative embodiment. The process in FIG. 15 can be implemented in hardware, software, or both. When implemented in software, the process can take the form of program instructions that is run by one or more processor units located in one or more hardware devices in one or more computer systems. For example, the process can be implemented in first platform 312 using receiver system 314 in FIG. 3 to receive sensor data such as sensor data 307 and sensor data 347 in FIG. 3.

The process begins by receiving modulated coherent optical signals modulated using radio frequency signals encoding sensor data (operation 1500). The process generates an input current using modulated coherent optical signals modulated using radio frequency signals encoding sensor data in response to receiving the modulated coherent optical signals (operation 1502). The process recovers the radio frequency signals from the input current in a manner that adjust for changes in the modulated coherent optical signals caused by variation in received optical intensity occurring during propagation of the modulated coherent optical signals (operation 1504). The process outputs the radio frequency signals encoding the sensor data (operation 1506). The process terminates thereafter.

Figure 16:
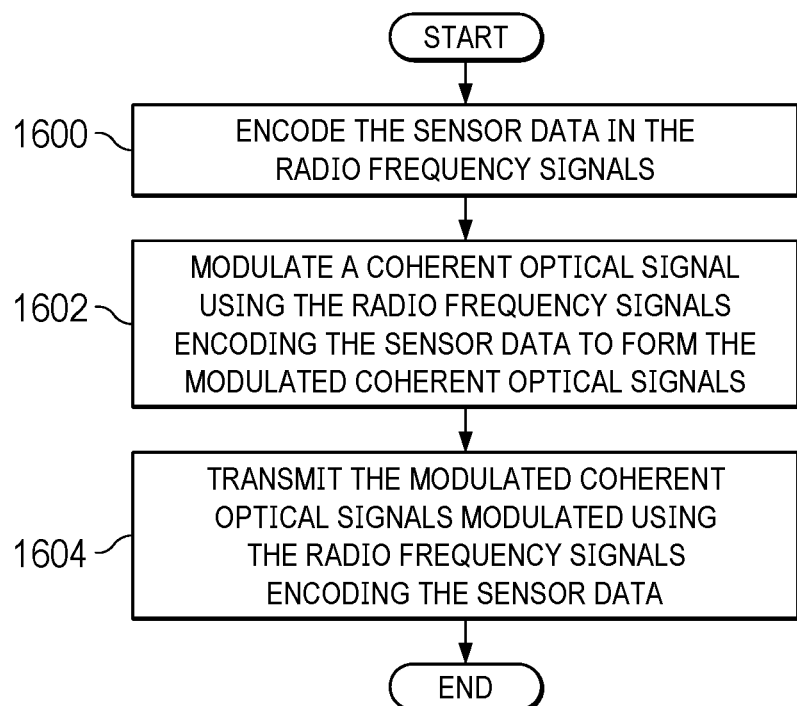
FIG. 16 is a flowchart of a process for method for communicating sensor data in accordance with an illustrative embodiment.

Turning to FIG. 16, a flowchart of a process for method for communicating sensor data is depicted in accordance with an illustrative embodiment. The process in FIG. 16 can be implemented in hardware, software, or both. When implemented in software, the process can take the form of program instructions that is run by one of more processor units located in one or more hardware devices in one or more computer systems. For example, the process can be implemented in second platform 318 using transmitter system 343 and sensor system 380 in FIG. 3 to transmit to receive sensor data such as sensor data 307 and sensor data 347 in FIG. 3. The operations in this flowchart can be additional operations performed with the operations depicted in FIG. 15.

The process begins by encoding the sensor data in the radio frequency signals (operation 1600). The process modulates a coherent optical signal using the radio frequency signals encoding the sensor data to form the modulated coherent optical signals (operation 1602).

The process transmits the modulated coherent optical signals modulated using the radio frequency signals encoding the sensor data (operation 1604). The process terminates thereafter.

Figure 17:
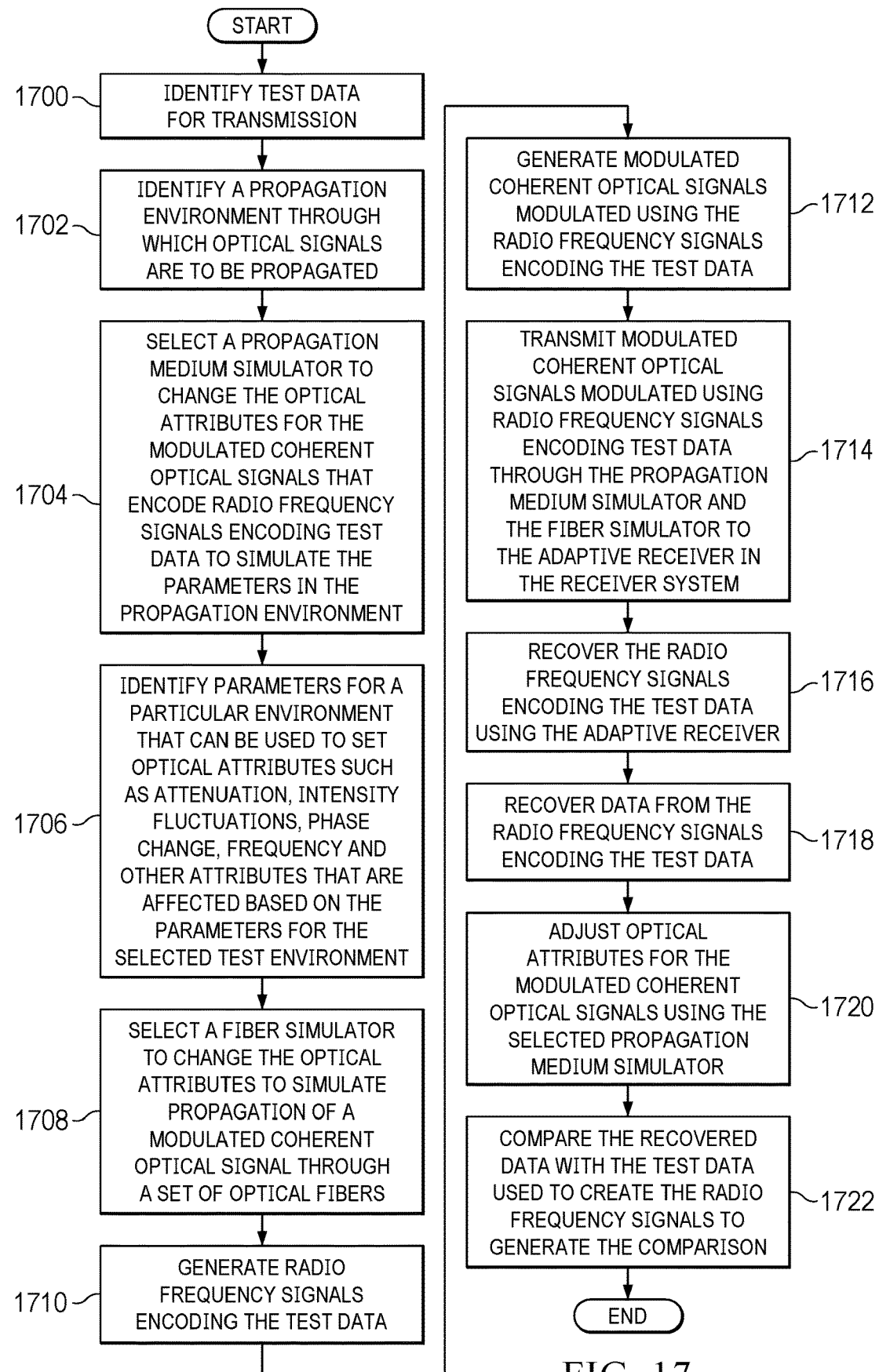
FIG. 17 is an illustration of a flowchart of a process for testing a receiver system in accordance with an illustrative embodiment.

Turning next to FIG. 17, an illustration of a flowchart of a process for testing a receiver system is depicted in accordance with an illustrative embodiment. In this illustrative example, the process can be performed using optical system test system 800 in FIG. 8.

The process begins by identifying test data for transmission (operation 1700). The process identifies a propagation environment through which optical signals are to be propagated (operation 1702). This test propagation environment can have various parameters that affect the propagation of coherent optical signals through that test environment. For example, the parameters for the environment can be visibility, moisture, particles, distance, and other parameters that are set based on the conditions for which the test is to be performed. For example, these parameters may be selected for conditions such as cloud cover, rain, snow, a thunderstorm, an ash from active volcano, pollution, ozone, or other environments. In one illustrative example, the environment can be set as an ideal environment in which the optimum conditions are present for propagating optical signals.

The process selects a propagation medium simulator to change the optical attributes for the modulated coherent optical signals that encode radio frequency signals encoding test data to simulate the parameters in the propagation environment (operation 1704).

In operation 1704, the propagation medium simulator changes the optical attributes in a manner that can reflect fluctuations in optical attributes such as intensity. This this simulator can change the intensity to reflect increases and decreases that may occur through the propagation of the modulated coherent optical signals through the atmosphere. Thus, optical attributes such as intensity can change as the modulated coherent optical signal that is received by the receiver system. For example, the modulated coherent optical signal can have a greater intensity at one time and a lower at another time because of the propagation through the atmosphere.

In this example, the optical attributes are selected to model the propagation of the modulated coherent signals through the propagation environment. For example, the parameters for the environment can be visibility, moisture, particles, and other parameters. The propagation medium simulator can be implemented using various types of modeling techniques. For example, the propagation medium simulator can take the form of a machine learning model, measurements made over time for the environment to be simulated, and other techniques. In this example, the propagation medium simulator can propagate different propagation environments such as space to ground transmission environments, point-to-point transmission environments in an urban area, and other types of environments.

The process identifies parameters for a particular environment that can be used to set optical attributes such as attenuation, intensity fluctuations, phase change, frequency and other attributes that are affected based on the parameters for the selected test environment (operation 1706). In this example, these selected parameters can change.

The process selects a fiber simulator to change the optical attributes to simulate propagation of a modulated coherent optical signal through a set of optical fibers (operation 1708).

The process generates radio frequency signals encoding the test data (operation 1710). The process generates modulated coherent optical signals modulated using the radio frequency signals encoding the test data (operation 1712).

The process transmits modulated coherent optical signals modulated using radio frequency signals encoding test data through the propagation medium simulator and the fiber simulator to the adaptive receiver in the receiver system (operation 1714). The process recovers the radio frequency signals encoding the test data using the adaptive receiver (operation 1716). The process recovers data from the radio frequency signals encoding the test data (operation 1718). The process adjusts optical attributes for the modulated coherent optical signals using the selected propagation medium simulator (operation 1720). The process compares the recovered data with the test data used to create the radio frequency signals to generate the comparison (operation 1722). The process terminates thereafter.

Figure 18:
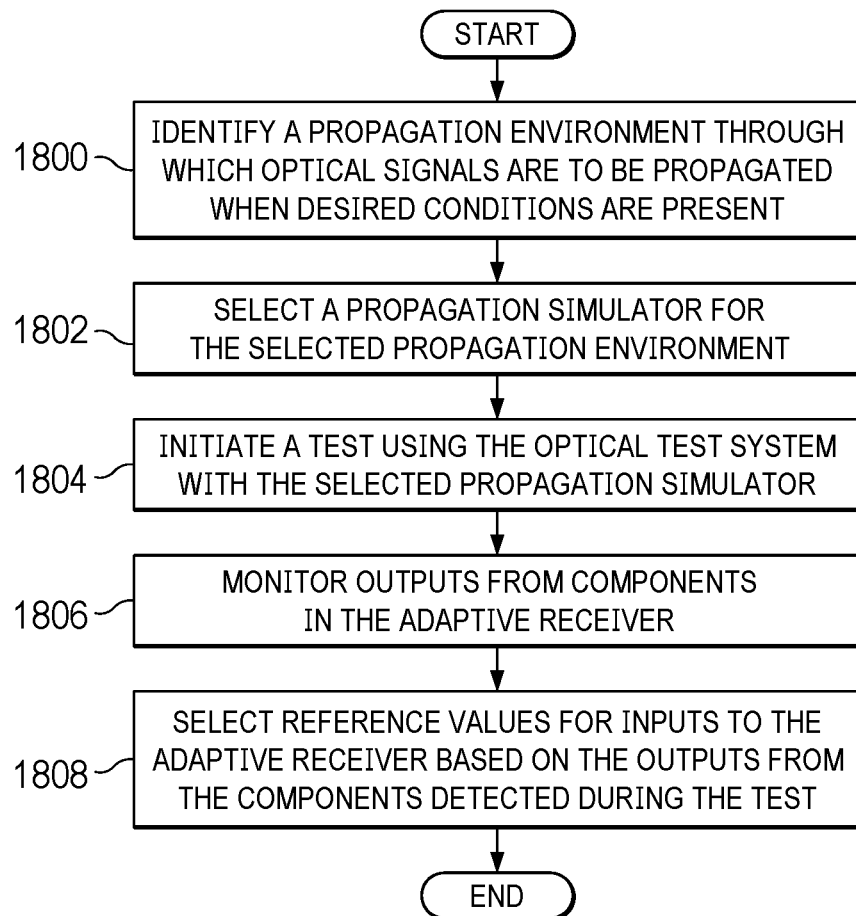
FIG. 18 is a flowchart of a process for selecting settings four and adaptive receiver in accordance with an illustrative embodiment.

Turning next to FIG. 18, a flowchart of a process for selecting settings four and adaptive receiver is depicted in accordance with an illustrative embodiment. In this illustrative example, the process can be performed using optical test system 800 in FIG. 8.

The process begins by identifying a propagation environment through which optical signals are to be propagated when desired conditions are present (operation 1800). For example, with a satellite to ground station transmission environment, the desired conditions can be optimal conditions present the for transmitting signals between a satellite and ground station. As another example, an environment in which signals are propagated between aircraft in flight can be selected.

The process selects a propagation simulator for the selected propagation environment (operation 1802). In this example, the propagation simulator can set optical attributes to simulate the propagation of modulated coherent optical signals in the desired conditions. In other words, these optical attributes reflect changes in intensity, phase, or other parameters that can occur under desired conditions.

The process initiates a test using the optical test system with the selected propagation simulator (operation 1804). The process monitors outputs from components in the adaptive receiver (operation 1806). The process selects reference values for inputs to the adaptive receiver based on the outputs from the components detected during the test (operation 1808). The process terminates thereafter.

For example, reference voltages to components can be selected for use in the adaptive operation of the adaptive receiver. These reference voltages can be selected to cause the adaptive receiver to maintain the operation of the components within the desired operating range. In one example, the output of an amplifier in an average current control loop can be used as the reference voltage for that amplifier. As another example, a peak voltage of a differential voltage output by a differential amplifier can be used as the reference peak voltage for an integrator in the automatic gain control loop in the adaptive receiver. In other words, the operation of components within the adaptive receiver can be controlled to reduce or avoid nonlinearity in the processing of a current to recover radio frequency signals encoding data.

The flowcharts and block diagrams in the different depicted embodiments illustrate the architecture, functionality, and operation of some possible implementations of apparatuses and methods in an illustrative embodiment. In this regard, each block in the flowcharts or block diagrams can represent at least one of a module, a segment, a function, or a portion of an operation or step. For example, one or more of the blocks can be implemented as program instructions, hardware, or a combination of the program instructions and hardware. When implemented in hardware, the hardware can, for example, take the form of integrated circuits that are manufactured or configured to perform one or more operations in the flowcharts or block diagrams. When implemented as a combination of program instructions and hardware, the implementation may take the form of firmware. Each block in the flowcharts or the block diagrams can be implemented using special purpose hardware systems that perform the different operations or combinations of special purpose hardware and program instructions run by the special purpose hardware.

In some alternative implementations of an illustrative embodiment, the function or functions noted in the blocks may occur out of the order noted in the figures. For example, in some cases, two blocks shown in succession may be performed substantially concurrently, or the blocks may sometimes be performed in the reverse order, depending upon the functionality involved. Also, other blocks may be added in addition to the illustrated blocks in a flowchart or block diagram.

The description of the different illustrative embodiments has been presented for purposes of illustration and description and is not intended to be exhaustive or limited to the embodiments in the form disclosed. The different illustrative examples describe components that perform actions or operations. In an illustrative embodiment, a component can be configured to perform the action or operation described. For example, the component can have a configuration or design for a structure that provides the component an ability to perform the action or operation that is described in the illustrative examples as being performed by the component. Further, to the extent that terms "includes", "including", "has", "contains", and variants thereof are used herein, such terms are intended to be inclusive in a manner similar to the term "comprises" as an open transition word without precluding any additional or other elements.

Many modifications and variations will be apparent to those of ordinary skill in the art. Further, different illustrative embodiments may provide different features as compared to other desirable embodiments. The embodiment or embodiments selected are chosen and described in order to best explain the principles of the embodiments, the practical application, and to enable others of ordinary skill in the art to understand the disclosure for various embodiments with various modifications as are suited to the particular use contemplated.

What is claimed is:

1. An adaptive receiver, comprising:
   a current buffer;
   an inverter-based transimpedance that receives input from the current buffer;
   an average current control loop that feeds back from the inverter-based transimpedance to the current buffer;
   a variable gain circuit that receives input from the inverter-based transimpedance;
   a differential voltage amplifier that receives input from the variable gain circuit;
   an automatic gain control loop that feeds back from the differential voltage amplifier to the inverter-based transimpedance and variable gain circuit; and
   a differential buffer that receives input from the differential voltage amplifier.

2. The adaptive receiver of claim 1, further comprising an offset cancellation loop that feeds back from the differential voltage amplifier to the variable gain circuit.

3. The adaptive receiver of claim 2, wherein the offset cancellation loop comprises:
   a low-pass filter;
   a second differential amplifier; and
   a second differential transadmittance amplifier.

4. The adaptive receiver of claim 1, wherein the variable gain circuit comprises:
   a differential transadmittance amplifier that converts input voltage to current; and
   a differential transimpedance amplifier that converts the current back to voltage.

5. The adaptive receiver of claim 4, wherein the variable gain circuit comprises Miller capacitances to decrease total capacitance at output of the differential transadmittance amplifier.

6. The adaptive receiver of claim 1, wherein the current buffer receives input current from a photodiode in an optical receiver.

7. The adaptive receiver of claim 1, wherein the differential buffer outputs a recovered radio frequency signal.

8. The adaptive receiver of claim 7, wherein the recovered radio frequency signal comprises a number of baseband signals.

9. The adaptive receiver of claim 1, wherein the average current control loop comprises:
   a low-pass filter; and
   an amplifier.

10. The adaptive receiver of claim 1, wherein the automatic gain control loop comprises:
    a peak detector; and
    an integrator.

11. The adaptive receiver of claim 1, wherein the inverter-based transimpedance comprises a voltage-controlled, variable gain, inverter-based transimpedance amplifier.

12. A receiver system, that comprises:
    an optical receiver comprising a photodiode;
    an adaptive receiver that receives an input current from the photodiode, wherein the adaptive receiver comprises:
      a feedback-controlled current buffer;
      a voltage-controlled inverter-based transimpedance that receives input from the feedback-controlled current buffer;
      a current control loop configured to feed back from the voltage controlled inverter-based transimpedance to the feedback-controlled current buffer and that automatically subtracts excessive average current of the photodiode from the input current;
      a variable gain circuit that receives input from the voltage-controlled inverter-based transimpedance;
      a differential voltage amplifier that receives input from the variable gain circuit;

an automatic gain control loop configured to feed back from the differential voltage amplifier to the voltage controlled inverter-based transimpedance and variable gain circuit;

a differential voltage amplifier that receives input from the variable gain circuit;

a differential buffer that receives input from the differential voltage amplifier and outputs a recovered radio frequency signal; and a number of demodulators that demodulate the recovered radio frequency signal into respective baseband signals.

13. The receiver system of claim 12, further comprising an offset cancellation loop that feeds back from the differential voltage amplifier to the variable gain circuit.

14. The receiver system of claim 13, wherein the offset cancellation loop comprises:
a low-pass filter;
a second differential amplifier; and
a second differential transadmittance amplifier.

15. The receiver system of claim 12, wherein the variable gain circuit comprises:
a differential transadmittance amplifier that converts input voltage to current; and
a differential transimpedance amplifier that converts the current back to voltage.

16. The receiver system of claim 12, wherein the current control loop comprises:
a low-pass filter; and
an amplifier.

17. The receiver system of claim 12, wherein the automatic gain control loop comprises:
a peak detector; and
an integrator.

18. An adaptative receiver, comprising:
a current buffer that receives input current from a photodiode;
a variable gain transimpedance amplifier connected to output of the current buffer;
an average current control feedback loop from the variable gain transimpedance amplifier back to the current buffer;
a differential transadmittance amplifier connected to output of the variable gain transimpedance amplifier;
a differential transimpedance amplifier connected to output of the differential transadmittance amplifier;
first and second capacitors connected between input and output of the differential transimpedance amplifier;
a differential voltage amplifier connected to output of the differential transimpedance amplifier;
an automatic gain control feedback loop from the differential voltage amplifier to the variable gain transimpedance amplifier and differential transimpedance amplifier; and
a differential buffer connected to output of the differential voltage amplifier.

19. The adaptive receiver of claim 18, further comprising an offset cancellation feedback loop from the differential voltage amplifier to the differential transimpedance amplifier.

20. The adaptive receiver of claim 18, wherein the differential buffer outputs a recovered radio frequency signal to a number of demodulators.

21. A communications system that comprises a receiver configured to convert a modulated coherent optical signal to a number of radio frequency signals encoding data, wherein the receiver comprises:
a current buffer;
an inverter-based transimpedance that receives input from the current buffer;
an average current control loop that feeds back from the inverter-based transimpedance to the current buffer;
a variable gain circuit that receives input from the inverter-based transimpedance;
a differential voltage amplifier that receives input from the variable gain circuit;
an automatic gain control loop that feeds back from the differential voltage amplifier to the inverter-based transimpedance and variable gain circuit;
a differential buffer that receives input from the differential voltage amplifier;
an optical receiver that generates an electrical current in response to receiving the modulated coherent optical signal; and
an adaptive circuit connected to the optical receiver, wherein the adaptive circuit is configured to execute the following:
recover a radio frequency signal from the electrical current;
adjust for changes in the modulated coherent optical signal caused by variation in received optical intensity occurring during propagation of the modulated coherent optical signal; and
output the radio frequency signal.

22. The communications system of claim 21, wherein the optical receiver comprises:
a receiver telescope;
adaptive optics;
an optical amplifier;
an optical bandpass filter; and
a photodiode.

23. The communications system of claim 21, further comprising an optical transmitter configured to generate the modulated coherent optical signal from the number of radio frequency signals encoding data, wherein the optical transmitter comprises:
a laser generator that generates a coherent light;
an optical modulator that modulates the coherent light to encode a radio frequency signal to the modulated coherent optical signal; and
a transmitter telescope that transmits the modulated coherent optical signal to the receiver.

24. The communications system of claim 23, wherein the optical modulator is configured to modulate at least one of an intensity or a phase of the modulated coherent optical signal to encode the radio frequency signal.

* * * * *